(12) United States Patent
Takahashi et al.

(10) Patent No.: US 8,629,896 B2
(45) Date of Patent: Jan. 14, 2014

(54) PANORAMIC CAMERA UNIT AND CAMERA SYSTEM WITH ARRAYED OPTICAL ELEMENTS

(75) Inventors: Koichi Takahashi, Hachioji (JP); Toshiya Sodeyama, Ina (JP); Fumito Orii, Chino (JP); Izuru Kiyokawa, Machida (JP)

(73) Assignee: Olympus Imaging Corp., Tokyo (JP)

( * ) Notice: Subject to any disclaimer, the term of this patent is extended or adjusted under 35 U.S.C. 154(b) by 656 days.

(21) Appl. No.: 12/776,197

(22) Filed: May 7, 2010

(65) Prior Publication Data
US 2010/0283831 A1 Nov. 11, 2010

(30) Foreign Application Priority Data

May 8, 2009 (JP) .................................. 2009-113651

(51) Int. Cl.
*H04N 7/00* (2011.01)
(52) U.S. Cl.
USPC .......................................................... 348/36
(58) Field of Classification Search
None
See application file for complete search history.

(56) References Cited

U.S. PATENT DOCUMENTS

| | | | | |
|---|---|---|---|---|
| 5,963,376 A * | 10/1999 | Togino | ........................ | 359/676 |
| 5,970,260 A * | 10/1999 | Nakayama et al. | ............. | 396/80 |
| 6,687,057 B1 * | 2/2004 | Yamazaki | ...................... | 359/637 |
| 6,704,052 B1 * | 3/2004 | Togino et al. | ................. | 348/340 |
| 7,242,425 B2 * | 7/2007 | Driscoll et al. | ............. | 348/207.1 |
| 2003/0112354 A1 * | 6/2003 | Ortiz et al. | ............... | 348/333.01 |

FOREIGN PATENT DOCUMENTS

| | | | |
|---|---|---|---|
| JP | 2000-089301 | | 3/2000 |
| JP | 2008-54097 | | 3/2008 |
| JP | 2008-060856 | * | 3/2008 |
| JP | 2008-306350 | | 12/2008 |

* cited by examiner

*Primary Examiner* — David Czekaj
*Assistant Examiner* — Tyler W Sullivan
(74) *Attorney, Agent, or Firm* — Straub & Pokotylo; John C. Pokotylo

(57) ABSTRACT

A camera unit capable of taking good visibility images covering a wide field of view, and having a thinner profile includes an imaging optical unit having free-curved surface prisms for forming subject images, a single imaging device for photoelectrically-converting the subject images from a plurality of directions formed by the imaging optical unit, a signal processing unit, a communication unit, and a control unit for controlling operation of the imaging device and the signal processing unit.

8 Claims, 23 Drawing Sheets

FIG. 1
(A)
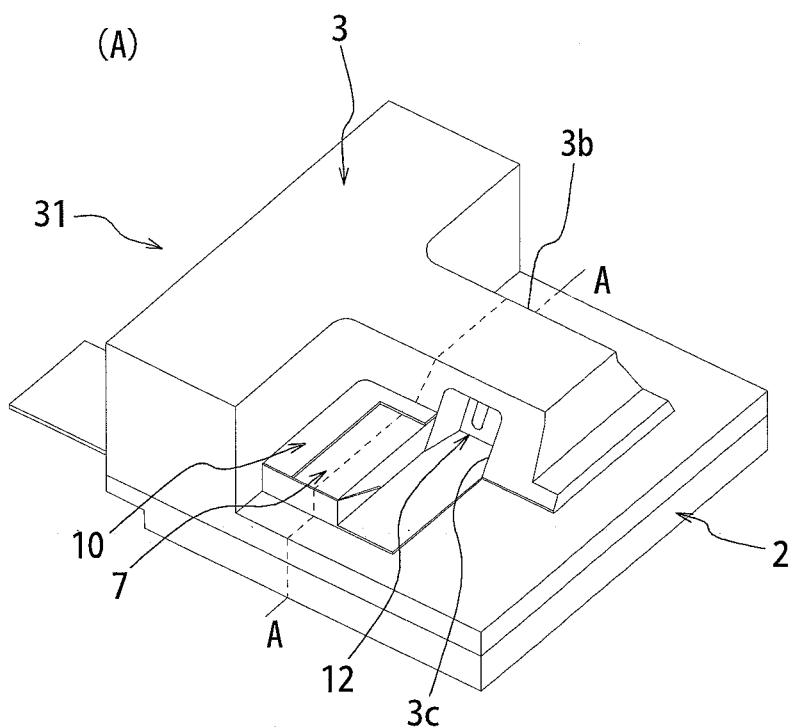
(B)
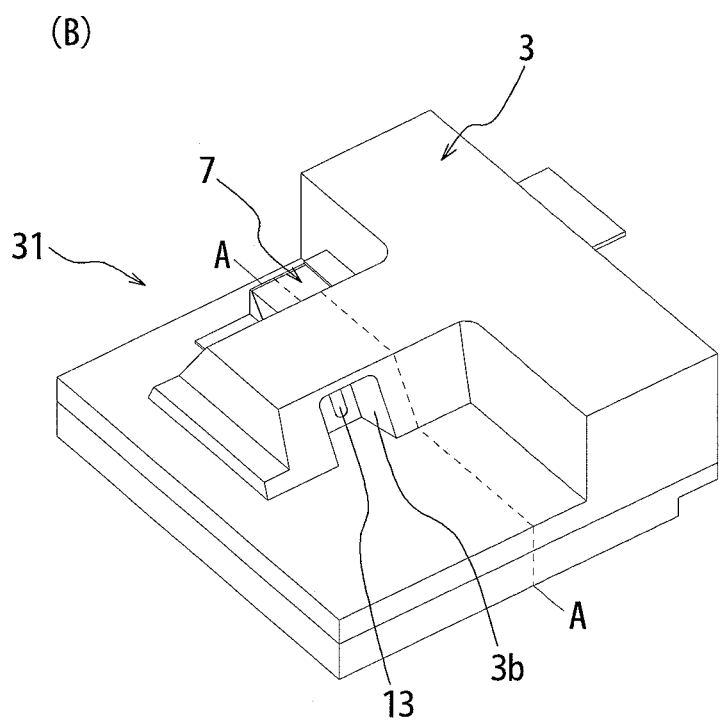

FIG. 18

| Address table | | LEFT | | RIGHT | | CENTER | |
|---|---|---|---|---|---|---|---|
| | | START | END | START | END | START | END |
| Read address | START | (1,1) | (1,250) | (1,251) | (1,500) | (1,501) | (1,750) |
| | END | (480,1) | (480,250) | (480,251) | (480,500) | (480,501) | (480,750) |
| Write address | START | (250,1) | (1,1) | (250,961) | (1,961) | (250,481) | (1,481) |
| | END | (250,480) | (1,480) | (250,1440) | (1,1440) | (250,960) | (1,960) |

PANORAMIC CAMERA UNIT AND CAMERA SYSTEM WITH ARRAYED OPTICAL ELEMENTS

CROSS-REFERENCE TO RELATED APPLICATION

The present application claims priority from Japanese Patent Application No. 2009-113651, filed on May 8, 2009, the content of which is incorporated herein by reference.

BACKGROUND OF THE INVENTION

1. Field of the Invention

This invention relates to a camera unit and a camera system using the unit.

2. Description of the Related Art

Recently, there are proposed, as the camera unit, various camera units including an on-vehicle camera unit for supporting driving of a vehicle, a surveillance camera unit for preventing crimes and disasters, a terminal-oriented camera unit for portable electric information terminals and the like. As such a camera unit, there are known, for example, one in which a substrate having an imaging device is provided with an imaging element drive unit, an image processing unit, a CPU and peripheral circuits such as a memory and the like (see JP 2008-54097 A, for example), and one in which a substrate having an imaging device is provided with a lens unit (see JP 2008-306350 A, for example), in order to achieve downsizing.

There is also known a camera unit in which, in order to take an image covering a wide field of view, a prism is disposed in the front side of an imaging lens, and light from a plurality of field of views incident on the prism is divided and imaged on a single imaging device through an imaging lens, thus taking images of a plurality of field of views all together (see JP 2000-89301 A, for example).

However, when using a normal lens with a field angle of about 120° or a fish-eye lens with a field angle of about 200°, for example, in the camera unit disclosed in JP 2008-54097 A or JP 2008-306350 A, the peripheral portion of an image formed on an image element is distorted and the visibility is thus deteriorated. Moreover, the improvement of the visibility requires image processing software for performing interpolation processing, distortion correction processing or the like on the peripheral portion of image data obtained by the imaging device, which increases the cost and deteriorates the usability for users.

In the camera unit disclosed in JP 2000-89301 A, moreover, a prism is disposed in the front side of an imaging lens, so that a length projecting forward from a light receiving surface of the imaging device becomes longer, and the camera unit becomes thicker.

Therefore, an object of the invention made in view of the above aspects is to provide a camera unit which is easily applicable for taking images covering a wide field of view and capable of taking images having good visibility and, further, which enables thinner profile and cost reduction, thus improving the usability for users, and a camera system using the unit.

SUMMARY OF THE INVENTION

A first aspect of the invention for achieving the above object is a camera unit comprising:

an imaging optical unit having a plurality of free-curved surface prisms for forming images of a plurality of fields of view;

a single imaging device for photoelectrically-converting the subject images formed by the imaging optical unit;

a signal processing unit for processing the photoelectrically-converted signals from the imaging device and outputting image signals;

a communication unit for performing communication with an external unit; and a control unit for controlling operation of the imaging device and the signal processing unit and transmitting the image signals output from the signal processing unit from the communication unit to the external unit.

A second aspect of the invention is the camera unit according to the first aspect, wherein the plurality of free-curved surface prisms have the same shape, each has three optical surfaces of a first surface having a transmission function for light from the outside, a second surface having a light internal reflection function and a light transmission function and a third surface having a light reflection function, among which optical surfaces having at least a reflection function have a lens function as well; and the imaging optical unit comprises a frame for fixedly-holding the plurality of free-curved surface prisms in parallel with each other;

a holder for the frame itself being placed thereon, provided with a single imaging device for imaging light emitted from each of the free-curved surface prisms, as visual-field images, in parallel; and a cover body having window holes open corresponding to the fields of view, for storing the frame and the free-curved surface prisms inside thereof with the cover body being fixed into the holder.

A third aspect of the invention is the camera unit according to the second aspect, wherein the first surface of the free-curved surface prism of the imaging optical unit has negative refractive power and the second surface and the third surface thereof have positive refractive power in an Y-Z plane.

A fourth aspect of the invention is the camera unit according to the third aspect, wherein the imaging optical unit is provided with two free-curved surface prisms disposed in parallel so that their first surfaces face toward a field of view covering right side and a field of view covering left side, respectively, with reference to a field of view covering front.

A fifth aspect of the invention is the camera unit according to the third aspect, wherein the imaging optical unit is provided with two free-curved surface prisms of a first free-curved surface prism or a second free-curved surface prism with its first surface facing toward a field of view covering either of right side and left side, and a third free-curved surface prism disposed in parallel with the first free-curved surface prism or the second free-curved surface prism; and the third free-curved surface prism is provided with a front prism with its incidence surface facing toward a field of view covering front.

A sixth aspect of the invention is the camera unit according to the fifth aspect, wherein an L-shaped fixed stop is disposed on an incidence surface of the front prism of the imaging optical unit and a tall elliptical fixed stop is disposed between the front prism and the third free-curved surface prism; and the front prism is arranged at an upper position so that its incidence surface is at an higher position than the first surface of the third free-curved surface prism.

A seventh aspect of the invention is the camera unit according to the third aspect, wherein the imaging optical unit comprises a first free-curved surface prism and a second free-curved surface prism disposed in parallel so that their first surfaces face toward a field of view covering right side and a field of view covering left side, respectively, with reference to a field of view covering front, and a third free-curved surface prism disposed in parallel so that its first surface faces toward the same direction as of the first surface of either of the first free-curved surface prism and the second free-curved surface prism; and the third free-curved surface prism has a front prism with its incidence surface facing toward a field of view covering front.

An eighth aspect of the invention is the camera unit according to the seventh aspect, wherein an L-shaped fixed stop is disposed on an incidence surface of the front prism of the imaging optical unit and a tall elliptical fixed stop is disposed between the front prism and the third free-curved surface prism; and the front prism is arranged at an upper position so that its incidence surface is at an higher position than the first surface of the third free-curved surface prism.

A ninth aspect of the invention is the camera unit according to the seventh aspect, wherein the imaging optical unit is arranged so that the first free-curved surface prism, the second free-curved surface prism and the third free-curved surface prism form subject images corresponding to a 60° field of view covering right side, a 60° field of view covering left side and a 60° field of view covering center on divided given positions, respectively, on the imaging device.

A tenth aspect of the invention for achieving the above object is a camera system comprising:

a camera unit; and an external unit, wherein the camera unit is provided with an imaging optical unit having a plurality of free-curved surface prisms for forming subject images of a plurality of fields of view;

a single imaging device for photoelectrically-converting the subject images formed by the imaging optical unit;

a signal processing unit for processing the photoelectrically-converted signals from the imaging device and outputting image signals;

a first communication unit for performing communication with an external unit; and a first control unit for controlling operation of the imaging device and the signal processing unit and transmitting the image signals output from the signal processing unit from the first communication unit to the external unit; and the external unit is provided with a second communication unit for performing communication with the camera unit;

an image processing unit for processing image signals from the camera unit received by the second communication unit;

an image display unit for displaying an image based on the image signals image-processed by the image processing unit; and a second control unit for controlling operation of the camera unit through the second communication unit and operation of the image processing unit and the image display unit.

An eleventh aspect of the invention is the camera system according to the tenth aspect, wherein the free-curved surface prism of the imaging optical unit has three optical surfaces of a first surface having a transmission function for light from the outside, a second surface having a light internal reflection function and a light transmission function and a third surface having a light reflection function, among which optical surfaces having at least a reflection function have a lens function as well; and the imaging optical unit comprises a frame for fixedly-holding the plurality of free-curved surface prisms in parallel with each other;

a holder for the frame itself being placed thereon, provided with a single imaging device for imaging light emitted from each of the free-curved surface prisms, as visual-field images, in parallel; and a cover body having window holes open corresponding to the fields of view, for storing the frame and the free-curved surface prisms inside thereof with the cover body being fixed into the holder.

A twelfth aspect of the invention is the camera system according to the eleventh aspect, wherein the first surface of the free-curved surface prism of the imaging optical unit has negative refractive power and the second surface and the third surface thereof have positive refractive power in an Y-Z plane.

A thirteenth aspect of the invention is the camera system according to the thirteenth aspect, wherein the imaging optical unit is provided with two free-curved surface prisms disposed in parallel so that their first surfaces face toward a field of view covering right side and a field of view covering left side, respectively, with reference to a field of view covering front.

A fourteenth aspect of the invention is the camera system according to the twelfth aspect, wherein the imaging optical unit is provided with two free-curved surface prisms of a first free-curved surface prism or a second free-curved surface prism with its first surface facing toward a field of view covering either of right side and left side, with reference to a field of view covering front, and a third free-curved surface prism disposed in parallel with the first free-curved surface prism or the second free-curved surface prism; and the third free-curved surface prism is provided with a front prism with its incidence surface facing toward a field of view covering front.

A fifteenth aspect of the invention is the camera system according to the fourteenth aspect, wherein an L-shaped fixed stop is disposed on an incidence surface of the front prism of the imaging optical unit and a tall elliptical fixed stop is disposed between the front prism and the third free-curved surface prism; and the front prism is arranged at an upper position so that its incidence surface is at an higher position than the first surface of the third free-curved surface prism.

A sixteenth aspect of the invention is the camera system according to the twelfth aspect, wherein the imaging optical unit comprises a first free-curved surface prism and a second free-curved surface prism disposed in parallel so that their first surfaces face toward a field of view covering right side and a field of view covering left side, respectively, with reference to a field of view covering front, and a third free-curved surface prism disposed in parallel so that its first surface faces toward the same direction as of the first surface of either of the first free-curved surface prism and the second free-curved surface prism; and the third free-curved surface prism has a front prism with its incidence surface facing toward a field of view covering front.

A seventeenth aspect of the invention is the camera system according to the sixteenth aspect, wherein an L-shaped fixed stop is disposed on an incidence surface of the front prism of the imaging optical unit and a tall elliptical fixed stop is disposed between the front prism and the third free-curved surface prism; and the front prism is arranged at an upper position so that its incidence surface is at an higher position than the first surface of the third free-curved surface prism.

An eighteenth aspect of the invention is the camera system according to the sixteenth aspect, wherein the imaging optical unit is arranged so that the first free-curved surface prism, the second free-curved surface prism and the third free-curved surface prism form subject images corresponding to a 60° field of view covering right side, a 60° field of view covering left side and a 60° field of view covering center on divided given positions, respectively, on the imaging device.

A nineteen aspect of the invention is the camera system according to the twelfth aspect, wherein the image processing unit generates one panoramic image from subject images formed on a plurality of regions of the imaging device, received by the second communication unit.

A twentieth aspect of the invention is the camera system according to the twelfth aspect, wherein a plurality of the camera units is connected to the external unit;

the external unit further has an operation input unit for inputting a display mode of images into the image display unit; and the second control unit image-processes image signals from the plurality of camera units at the image processing unit in accordance with a display mode input from the operation input unit and displays them on the image display unit.

According to the camera unit of the invention, a subject image is formed on an imaging device using a free-curved surface prism. Thus, the use of a plurality of free-curved surface prisms makes the camera unit to be easily applicable in taking images covering a wide field of view, and to take images having good visibility. Therefore, image processing such as interpolation processing, distortion correction processing and the like on the peripheral portion of image data becomes unnecessary, thus enabling cost reduction and improvement of the usability for users. Since a free-curved surface prism is used, moreover, the size in a normal direction of the imaging device of the imaging optical system can be smaller, thus enabling to reduce thickness of a camera unit.

According to the camera system of the invention, the camera unit exerts the above effects, and it is thus made possible to use the system in various uses such as vehicle driving support, crime-prevention, disaster-prevention and the like.

BRIEF DESCRIPTION OF THE DRAWING

FIGS. 1A and 1B are external perspective views of a camera unit of the first embodiment of the invention when viewing from a different direction, respectively.

FIG. 18 is a diagram exemplifying an address table of the first frame memory and the second frame memory for generating the panoramic image shown in FIG. 17.

DESCRIPTION OF THE PREFERRED EMBODIMENTS

Figure 2:
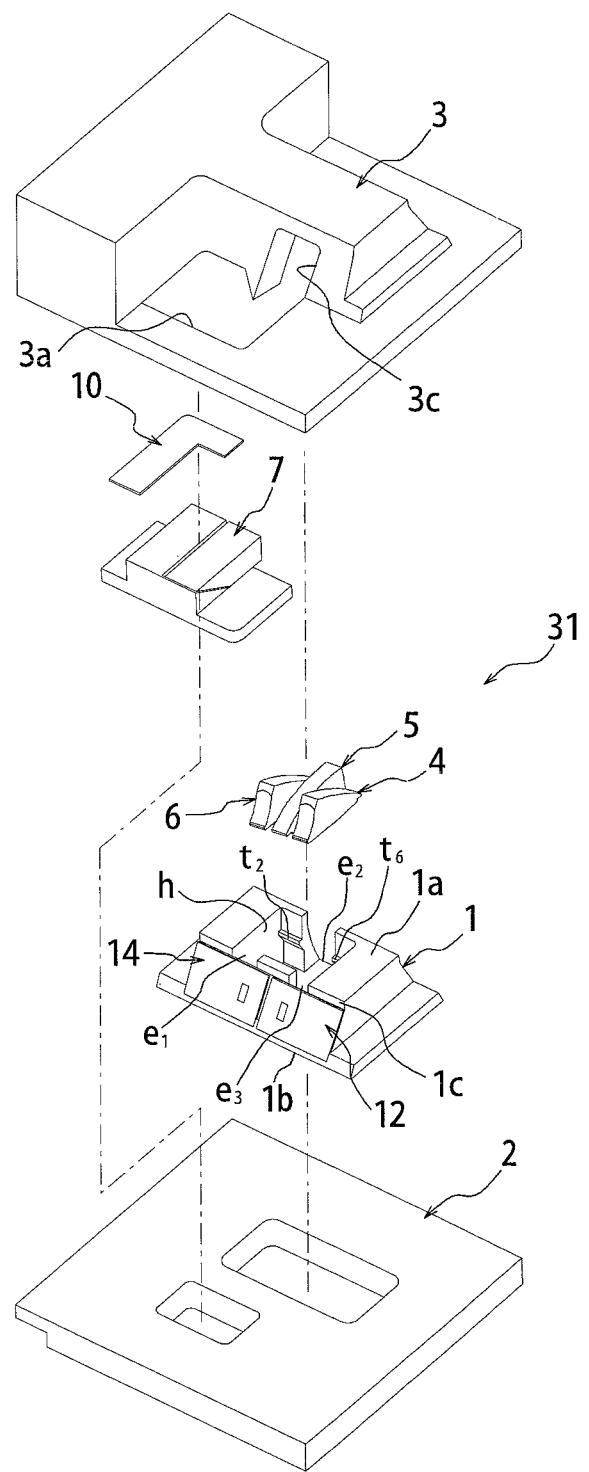
FIG. 2 is an exploded perspective view of a camera unit shown in FIG. 1.
Figure 3:
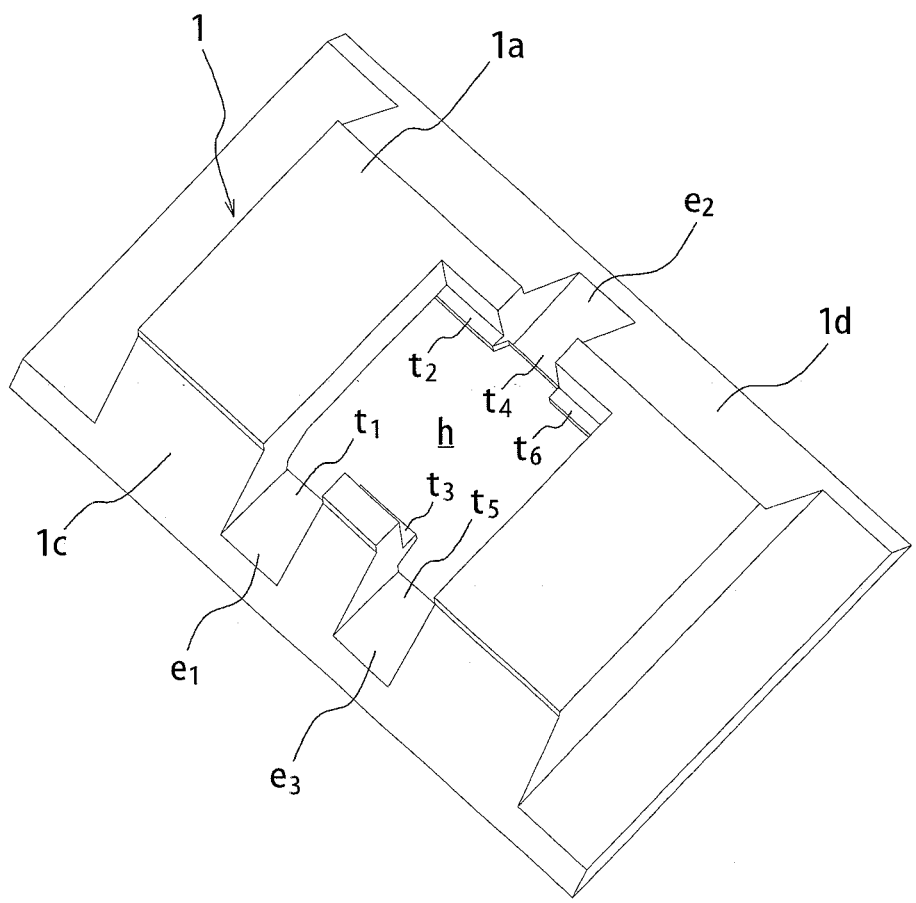
FIG. 3 is an external view of a frame shown in FIG. 2.
Figure 4:
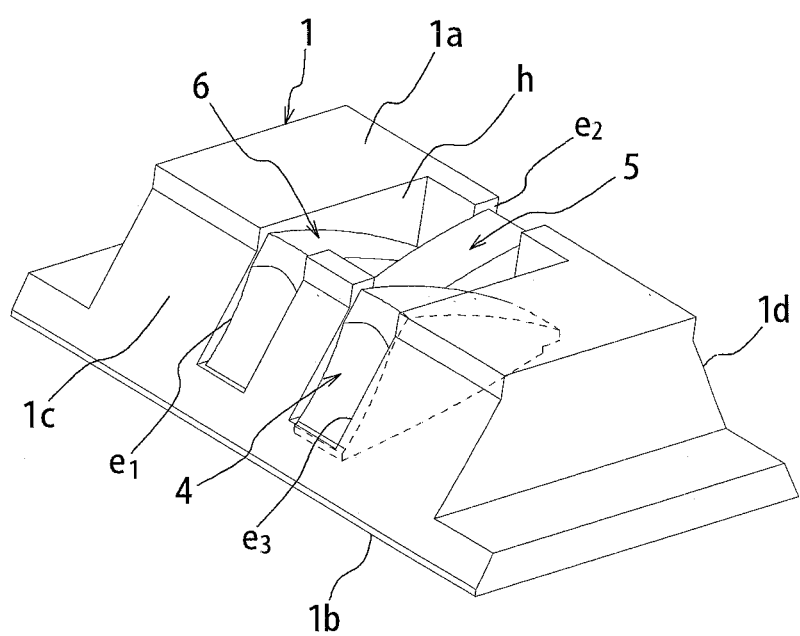
FIG. 4 is an external perspective view of a frame shown in FIG. 2 with a free-curved surface prism mounted.

Embodiments of the invention will be described with reference to the accompanying drawings.

First Embodiment

First, a camera unit according to the first embodiment of the invention will be described with reference to FIGS. 1 to 12.

As shown in FIGS. 1 to 5, collectively, a camera unit 31 has a frame 1, a holder 2 and a cover body 3. The frame 1 has, in the center portion in a longitudinal direction thereof, a through hole h penetrating from a top surface 1a to a bottom surface 1b, and slope side surfaces 1c and 1d positioned at the both sides of the top surface 1a and the bottom surface 1b are provided with sectional recesses $e_1$ to $e_3$ cut out so that the recesses are open to the through hole h. Then, at positions opposite to each other with respect to the bottom portions of the sectional recesses $e_1$ to $e_3$ are formed seat portions $t_1$ to $t_6$ constituting a pair by two (a pair by band $t_2$; a pair by $t_3$ and $t_4$; and a pair by $t_5$ and $t_6$) (see FIGS. 3 and 5).

The holder 2 is for the frame 1 being placed thereon and, as described later, for holding a substrate having an imaging device 15 and the peripheral circuits. Moreover, the cover body 3 fits in the holder 2 to store three free-curved surface prisms 4, 5, 6 as well as the frame 1 inside thereof.

The cover body 3 is provided with window holes $3a$ to $3c$ which are open on the first surface (incidence surface) of the free-curved surface prisms 4, 5, 6, and fixed to the frame 1 by screwing or bonding. The window holes $3a$ to $3c$ of the cover body 3 are appropriately provided with cover glass or the like for preventing the invasion of foreign substances, and an open angle of the window holes $3a$ to $3c$ is set depending on performances of the free-curved surface prisms 4, 5, 6 (a possible range of the field of view) and elliptical fixed stops 12 to 14 (see FIG. 6).

Figure 6:
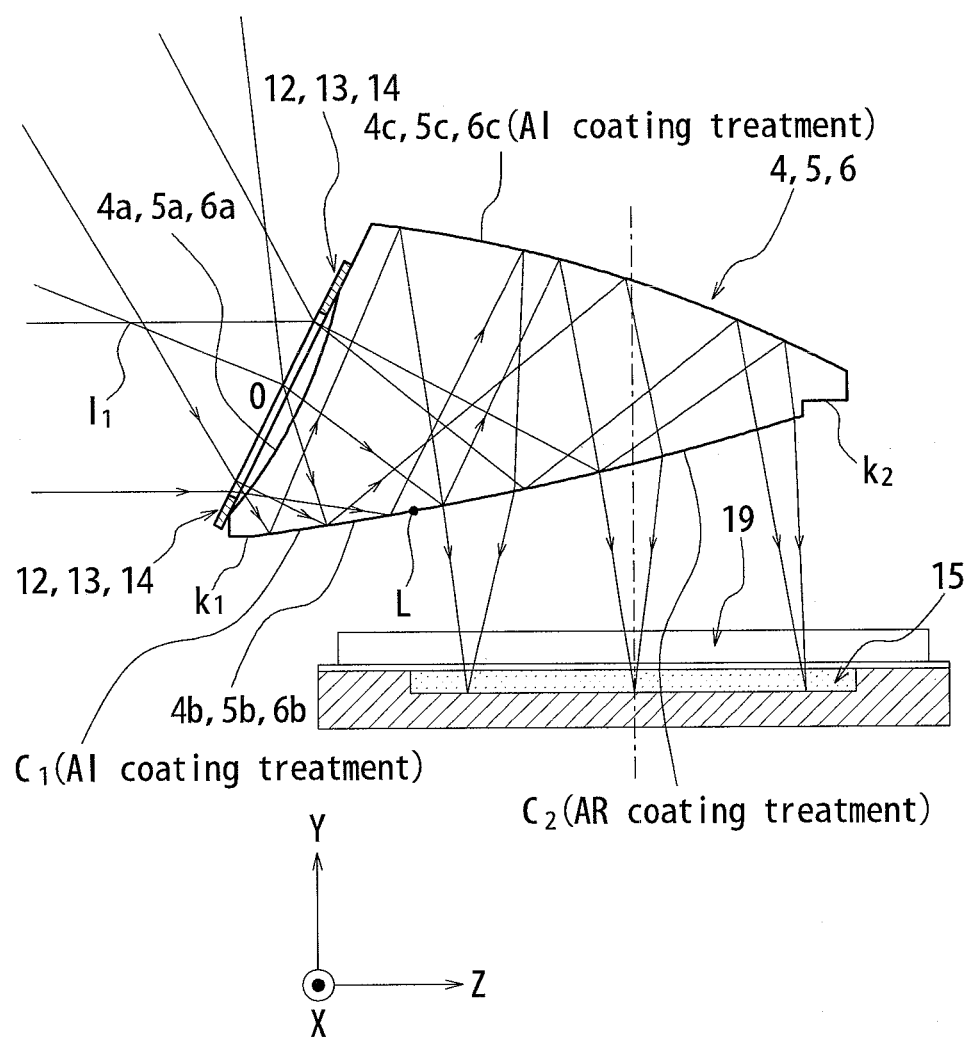
FIG. 6 is a diagram illustrating a Y-Z plane of a free-curved surface prism used in the camera unit shown in FIG. 1.

The free-curved surface prism (the first free-curved surface prism) 4 can take images covering a left field of view with an angle $\theta_2$ (60° forward from the directly beside (the outer surface of the window hole $3c$ which is a recess formed in the cover body 3) (See FIGS. 4 and 9), for example. As shown in FIGS. 6, 7(A) and 7(B), the free-curved surface prism 4 has three optical surfaces of the first surface (an incidence surface) $4a$ having a light transmission function, the second surface (which is an exit surface on the exit side of the bottom wall $1b$ of the through hole h) $4b$ having a light internal reflection function and a light transmission function and the third surface $4c$ having a light reflection function. The second surface $4b$ and the third surface $4c$ also have a lens function, and on the both ends of the second surface $4b$ is provided steps $k_1$, $k_2$, which fit in the seat portions $t_5$ and $t_6$ of the frame 1 so that they can be positioned and fixedly-held easily and accurately (see FIGS. 3 and 6).

Figure 7:
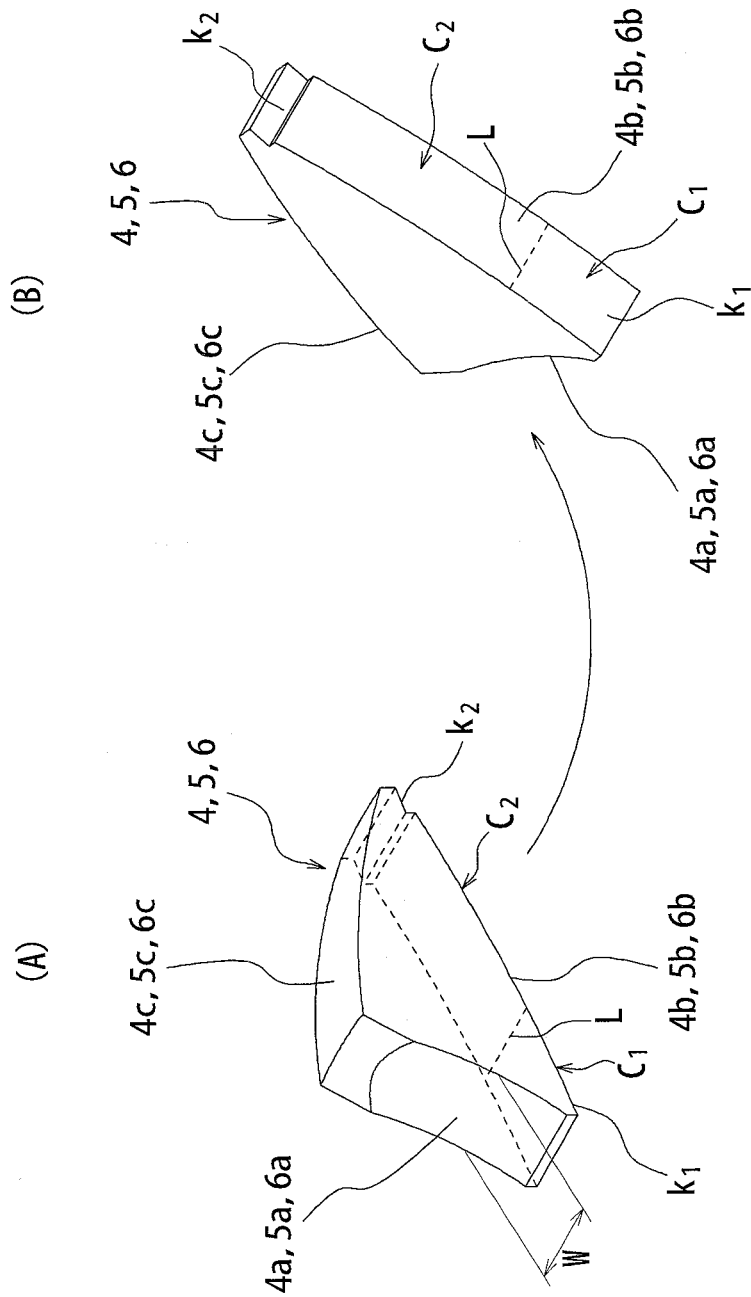
FIGS. 7(A) and 7(B) are perspective views illustrating the appearance of a free-curved surface prism used in the camera unit shown in FIG. 1.
Figure 8:
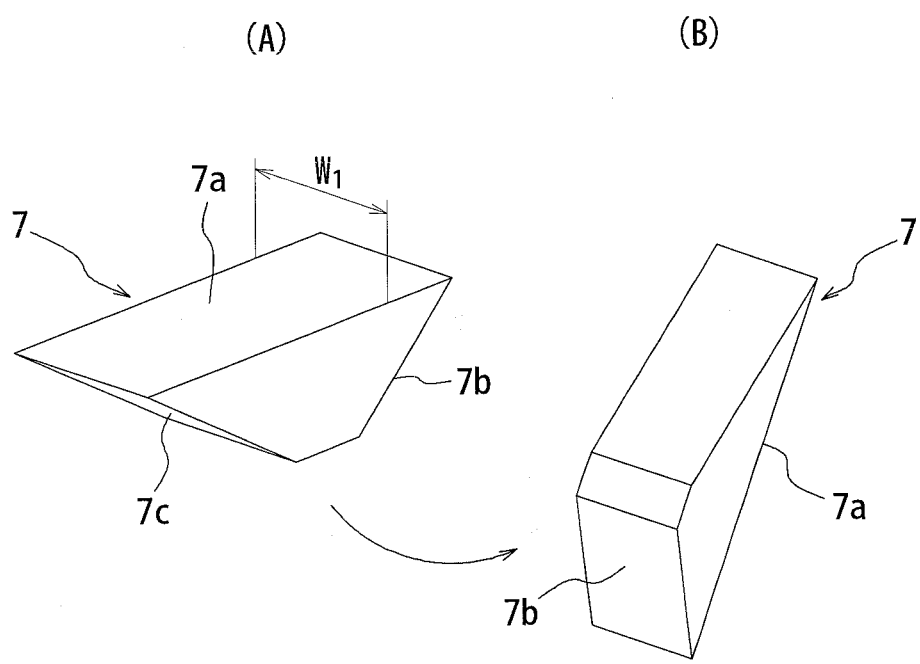
FIGS. 8(A) and 8(B) are perspective views illustrating the appearance of a front prism used in the camera unit shown in FIG. 1.

The free-curved surface prism (the second free-curved surface prism) 5 has the same outer shape as the free-curved surface prism 4 (see FIGS. 2 and 7). The free-curved surface prism 5 is disposed in the through hole h in parallel with the free-curved surface prism 4 so that the first surface $5a$ as an incidence surface faces toward an opposite direction from that of the free-curved surface prism 4 by rotating the free-curved surface prism 5 by 180° relative to the free-curved surface prism 4 around an axis of an imaging plane of the imaging device 15 in FIG. 6. It is thus possible to take an image covering a right field of view with an angle $\theta_2$ (60° forward from the just beside, for example.

Moreover, the free-curved surface prism (the third free-curved surface prism) 6 has the same outer shape as the free-curved surface prism 4 and the free-curved surface prism 5 (see FIGS. 2 and 7). The free-curved surface prism 6 is disposed in the through hole h in parallel with the free-curved surface prism 4 in the same direction (see FIG. 4), and on the entrance side of the first surface $6a$ is disposed a front prism 7 having a triangular-prism shape, a trapezoid shape or the like as shown in FIGS. 8(A) and 8(B). Moreover, on the incidence surface $7a$ of the front prism 7 is provided an L-shaped fixed stop 10 (see FIG. 5).

Figure 5:
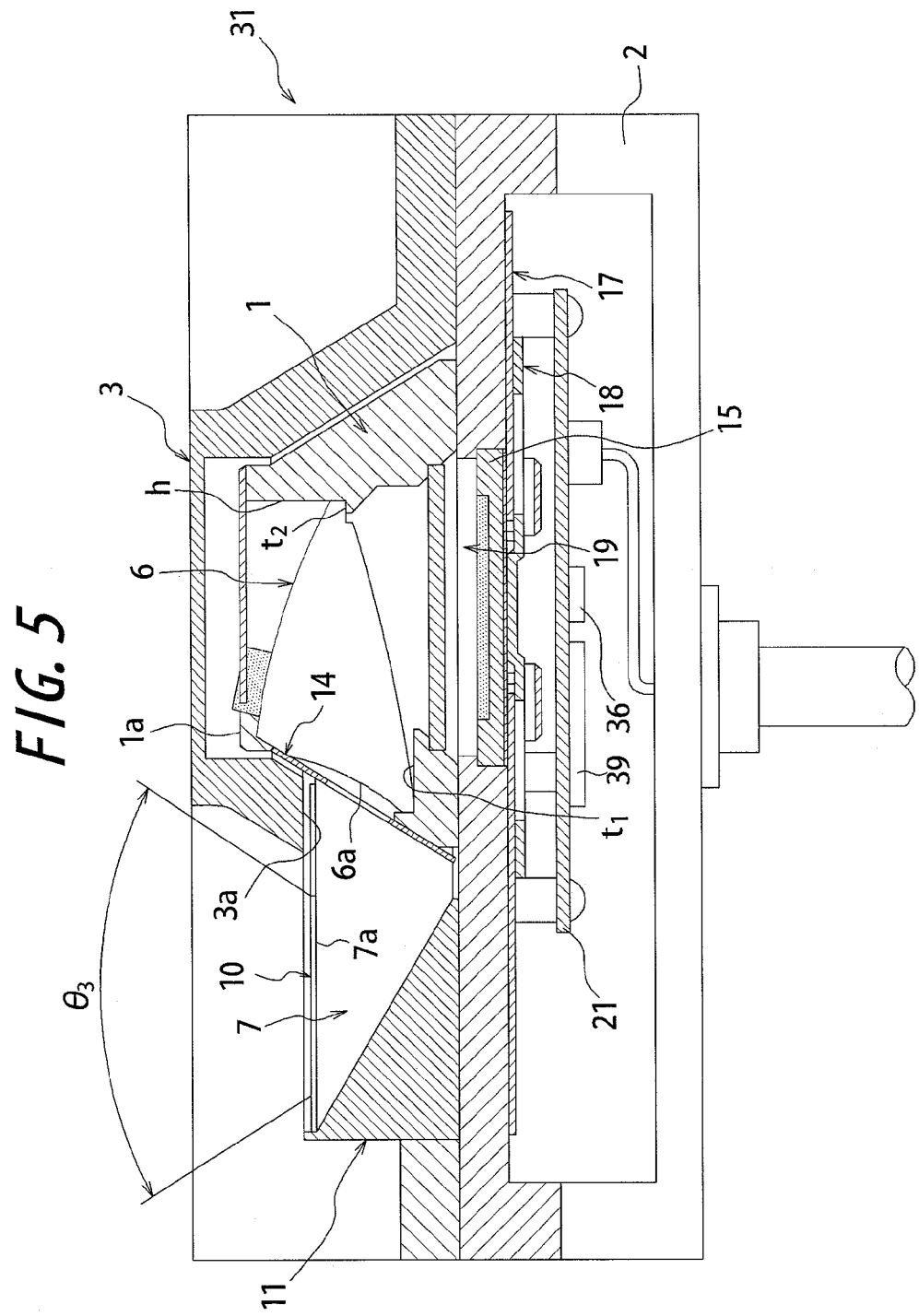
FIG. 5 is a cross-sectional view taken along the line A-A in FIG. 1.

As shown in FIG. 5, light incident from the front prism 7 passes through the free-curved surface prism 6, and an image is then formed on the imaging device 15. That is, the free-curved surface prism 6 can take images covering a field of view (a field of view covering front) with an angle $\theta_3$ (60° in total; a 30° field of view covering right side and a 30° field of view covering left side, with reference to the direct front (see FIG. 9). In order to take in larger amount of light of visual field to be imaged, the front prism 7 has a thickness $W_1$ (see FIG. 8(A)), which is thicker than the thickness W of the free-curved surface prism 6 (see FIG. 7(A)), and is arranged at the upper position so that the incidence surface $7a$ is at a higher position than the first surface $6a$ of the free-curved surface prism 6 (see FIGS. 5, 7(A) and 8(A)).

The imaging element 15 is constituted by a CMOS (Complementary Metal Oxide Semiconductor) or CCD (Charge Coupled Devices) and connected to a substrate 17 constituted by a flexible printed wiring substrate or a rigid printed wiring substrate. The imaging device 15 is provided, on its back surface, with a thermal insulation member such as a silicon seat or the like and a heat radiating plate 18 through an opening formed on the substrate 17 and, on its front surface, with a protection board 19 (glass or the like). The substrate 17, the heat radiating plate 18 and the protection board 19 are placed together with the imaging device 15 on a penetrating opening of the holder 2 so that they correspond with the through hole h of the frame 1. The substrate 17 is connected to the substrate 21 having peripheral circuits.

The substrate 21 is constituted by a flexible printed wiring substrate or a rigid printed wiring substrate, and connected to the substrate 17 via a flexible printed wiring substrate. Thus, there are cases that the substrate 17 and the substrate 21 are of an integrated flexible printed wiring substrate, that either of the substrates is of a flexible printed wiring substrate, or that both of the substrates are of a rigid printed wiring substrate and connected to each other via a flexible printed wiring substrate.

Figure 10:
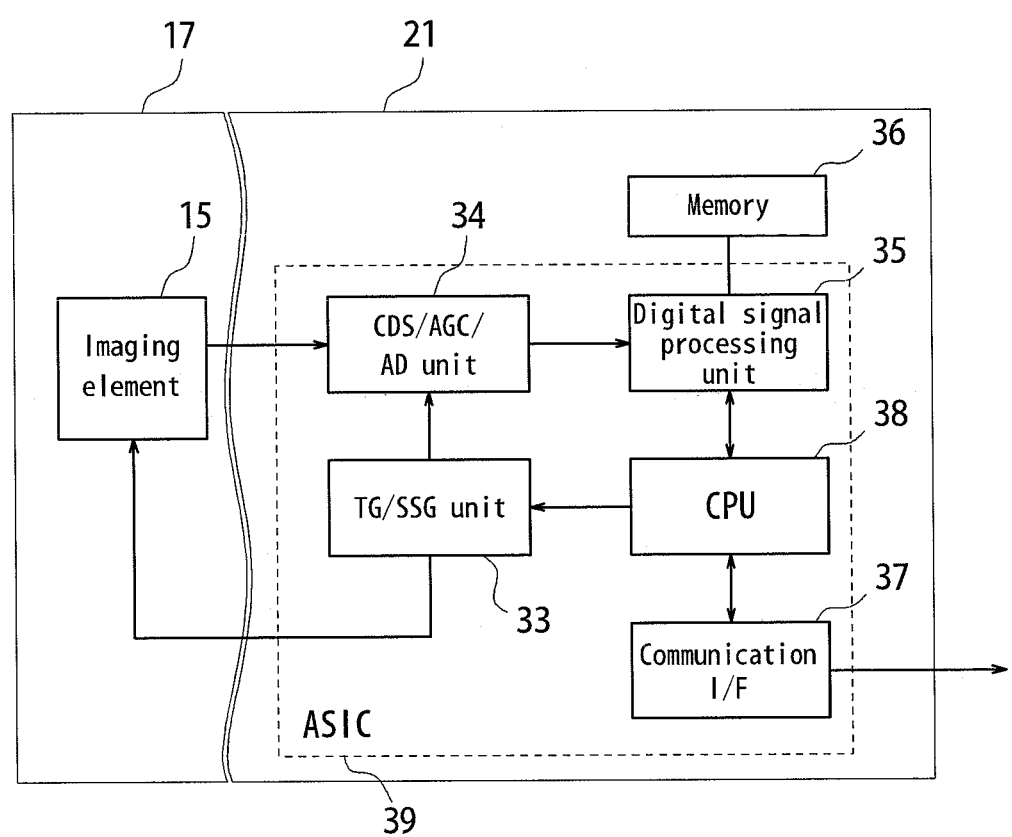
FIG. 10 is a functional block diagram illustrating the configuration of an image element and the peripheral circuits mounted on a substrate of the camera unit shown in FIG. 1.

As shown in detail in FIG. 10, the substrate 21 is provided, as peripheral circuits, with a TG/SSG (Timing Generator/Synthesized Signal Generator) unit 33, a CDS/AGC/AD (Correlated Double Sampling/Auto Gain Control/Analog-to-Digital Convertor) unit 34, a digital signal processing unit 35, a memory 36, a communication I/F 37, and with a CPU (the first control unit) 38 for controlling the operation of each unit.

The imaging device 15 takes a video based on imaging timing pulses from the TG/SSG unit 33 and outputs image signals to the CDS/AGC/AD unit 34. The CDS/AGC/AD unit 34 performs correlated double sampling on the image signals from the imaging device 15, adjusts a gain depending on the signal amount, performs A/D-conversion of the signals, and then outputs them to the digital signal processing unit 35. In the digital signal processing unit 35, thereafter, the input digital image signals are subjected to color signal interpolation, color correction, white balance adjustment and the like using the memory 36, and output as captured image data to an external unit via the communication I/F 37.

The CPU 38 controls the operation of each unit of the camera unit 31 depending on commands for exposure setting, gain adjustment and the like by the external unit. The settings of white balance, exposure correction and the like of captured images are the same as those of general video cameras, and thus the detailed description will be omitted.

Moreover, the TG/SSG unit 33 constitutes an imaging device drive unit, the CDS/AGC/AD unit 34, the digital signal processing unit 35 and the memory 36 constitute a signal processing unit, and the communication I/F 37 constitutes a communication unit (the first communication unit). It is noted that, in the embodiment, the TG/SSG unit 33, the CDS/AGC/AD unit 34, the digital signal processing unit 35, the communication I/F 37 and the CPU 38, except for the memory 36, are constituted by an ASIC 39. Furthermore, the substrate 21 is provided, if necessary, with a power circuit supplying required power to each unit.

The free-curved surface prisms 4 to 6 used in the camera unit 31 of the embodiment have the same shape, and are composed of the same medium having a refractive index of more than 1.31. Any optical surfaces of the prism are free-curved surfaces with a Y-Z plane as an only symmetry plane, which are arranged so as to provide power to luminous flux and have a rotationally-asymmetric plane form for correcting aberration generated due to eccentricity. In addition, the first surface and the third surface among three surfaces are rotationally-asymmetric planes. Here, the Y-Z plane is a plane in parallel with the paper of FIG. 6 (in which all of free-curved surface prisms 4 to 6 are illustrated in the same direction), and the use of the free-curved surface prisms 4 to 6 makes it possible to take images at a wide filed angle with high accuracy without using a fish-eye lens. It is noted that the symbol $l_1$ indicates an axial principal ray and O indicates the center of the stop in FIG. 6.

Moreover, light from a subject is incident on the first surfaces 4a to 6a to pass therethrough, and internally reflected by the second surfaces 4b to 6b and the third surfaces 4c to 6c sequentially, and then passes through the second surfaces 4b to 6b to the imaging device 15. Here, each of the first to third optical surfaces has refractive power in the X-Z plane and the Y-Z plane in FIG. 6, as shown in Table 1. That is, the first surfaces 4a to 6a have positive refractive power in the X-Z plane and negative refractive power in the Y-Z plane, and the second surfaces 4b to 6b have negative refractive power in the X-Z plane and positive refractive power in the Y-Z plane. In addition, the third surfaces 4c to 6c have positive refractive power in both the X-Z plane and the Y-Z plane.

TABLE 1

| Optical surface | X-Z plane | Y-Z plane |
| --- | --- | --- |
| First surface | Positive | Negative |
| Second surface | Negative | Positive |
| Third surface | Positive | Positive |
| Second surface | Negative | Positive |

With respect to the free-curved surface prisms 4 to 6, as is clear from Table 1, the refractive-index in the Y-Z plane is negative, positive, positive and positive, from the first surface 4a to 6a as an incidence surface to the second surface 4b to 6b as an exit surface in this order and, in a simplified manner, such an arrangement is of so-called retrofocus having a combination of refractive power being from negative to positive in a direction from the incidence side. Therefore, back focus can be longer, which makes it possible to appropriately secure the distance between the imaging device 15 and the free-curved surface prisms 4 to 6 and, further, which is advantage for disposing optical members such as an IR cut filter, an optical low pass filter and the like.

Moreover, the coma aberration is corrected with respect to the first surfaces 4a to 6a and the second surfaces 4b to 6b in the X-Z plane using positive refractive power and negative refractive power, and the third surfaces 4c to 6c and the second surfaces 4b to 6b (the exit surface in this case) have a function of making an image surface flat by positive refractive power and negative refractive power.

In such an arrangement of optical surfaces, furthermore, principal ray inclined inward relative to an image surface due to positive refractive power of the third surfaces 4c to 6c, is rendered to be a beam substantially-perpendicular to the image surface by negative refractive power of the second surfaces 4b to 6b (the exit surface in this case), which contributes to the fulfillment of image-side telecentric conditions in the X-Z plane.

In the above camera unit 31, an optical image corresponding to a 60° field of view covering left, which has been focused by the free-curved surface prism 4, is formed on a given region of the imaging device 15, and an optical image corresponding to a 60° field of view covering right side, which has been focused by the free-curved surface prism 5, is formed, in parallel with the optical image of the 60° field of view covering left side, on a given region of the imaging device 15. In addition, an optical image corresponding to a 60° field of view covering center, which has been focused by the front prism 7 and the free-curved surface prism 6, is formed, in parallel with other optical images, on a given region of the imaging device 15. That is, three visual-field images are formed in parallel on the single imaging device 15. Therefore, the camera unit 31 can take images in a range of 180° covering left, front and then right.

Figure 9:
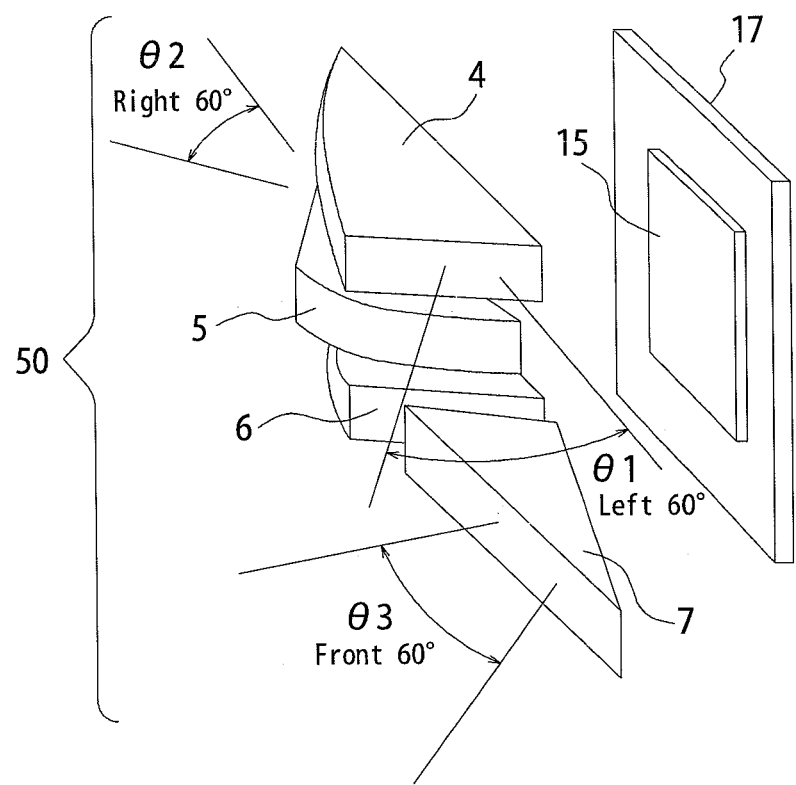
FIG. 9 is a diagram for explaining the configuration of an imaging optical system of the camera unit shown in FIG. 1.
Figure 12:
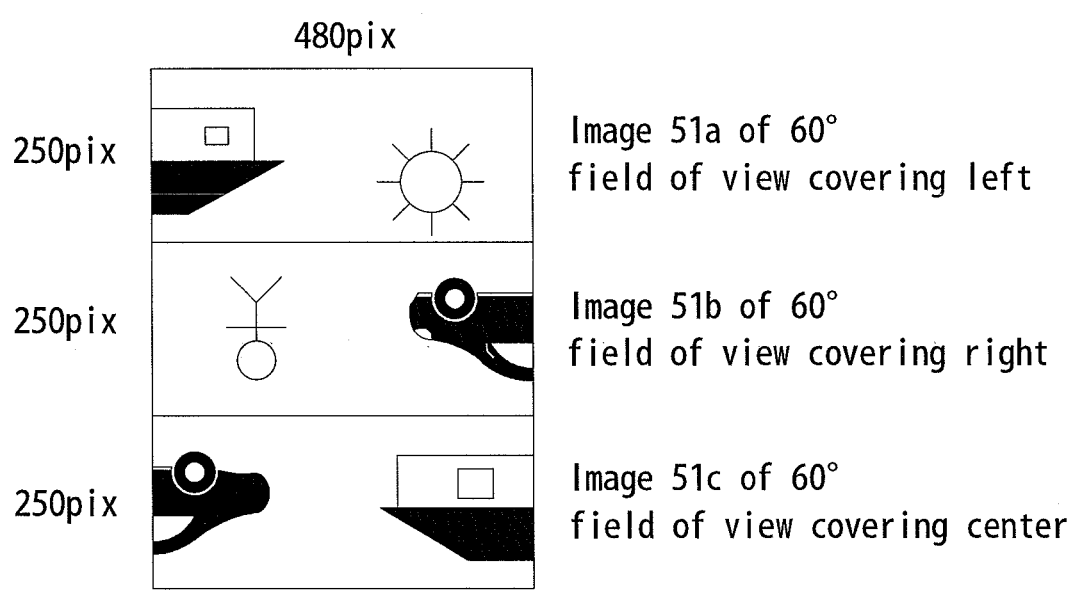
FIG. 12 is a diagram for explaining the positional relationship among three partial images, which are formed on an imaging device, and their size when taking an image of the subject shown in FIG. 11.

As shown in FIG. 9, the camera unit 31 has an imaging optical unit 50 composed of the free-curved surface prisms 4, 5, 6 and the front prism 7, and the imaging device 15. Here, an imaging device used in general cameras is rectangular, and placed, facing toward a subject, so that the long side of a screen is along a horizontal direction and the short side thereof is along a vertical direction when taking images of landscapes. On the other hand, the camera unit 31 of the embodiment is placed so that the short side of the imaging device 15 is along a horizontal direction of a subject, and divided three images are stacked in a longitudinal direction of the imaging device 15 for formation thereof, as shown in FIG. 12.

Figure 11:
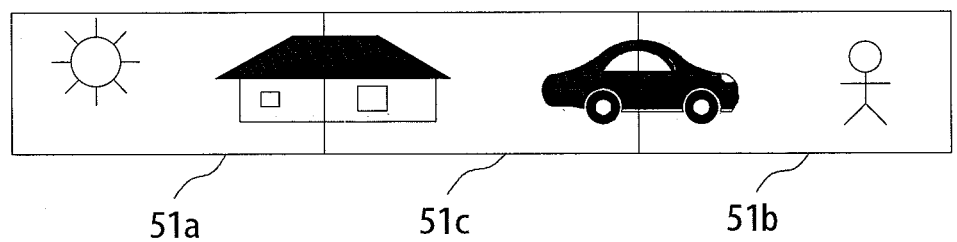
FIG. 11 is a diagram exemplifying an image capturing range of a subject by the camera unit shown in FIG. 1.

FIG. 11 exemplifies an image of a subject when the camera unit 31 takes an image covering a 180° field of view. When an image of the subject is taken by the camera unit 31, partial images 51a, 51b, 51c shown in FIG. 12 are formed on the imaging device 15. In FIG. 12, the partial image 51a is an image corresponding to a 60° field of view covering left side, which has been formed by the free-curved surface prism 4; the partial image 51b being an image corresponding to a 60° field of view covering right side, which has been formed by the free-curved surface prism 5; and the partial image 51c being an image corresponding to a 60° field of view covering center, which has been formed by the front prism 7 and the free-curved surface prism 6.

As above, according to the camera unit 31 of the embodiment, images of a subject taken from front-side 60°, right-side 60° and left-side 60° are formed, using three free-curved surface prisms 4, 5, 6, on a given region of the single imaging device 15, respectively. Thus, an image with good visibility can be formed. Thereby, image data corresponding to a wide visual field covering 180° can be obtained at high resolution without performing image processing such as interpolation processing, distortion correction processing and the like on the peripheral portions of image data, thus enabling cost reduction and the improvement of usability for users. As shown in FIG. 5, moreover, the front prism 7 and the free-curved surface prism 6 are not stacked on the front surface of the imaging device 15, which can prevent the camera unit 31 from becoming thicker. Furthermore, there are formed partial images covering front, right and left, which correspond to three free-curved surface prisms 4, 5, 6. Thus, an external unit can perform processing including enlargement of images on each partial image, and various display modes can be achieved easily.

As shown in FIG. 5, moreover, the front prism 7 and the free-curved surface prism 6 are not stacked on the front surface of the imaging device 15, which can prevents the camera unit 31 to become thicker. Furthermore, there are formed partial images covering front, right and left, which correspond to three free-curved surface prisms 4, 5, 6. Thus, an external unit can perform processing including enlargement of images on each partial image, and various display modes can be achieved easily.

Second Embodiment

Next, a camera system using the above camera unit 31 according to the second embodiment of the invention will be described with reference to FIGS. 13 to 23.

Figure 13:
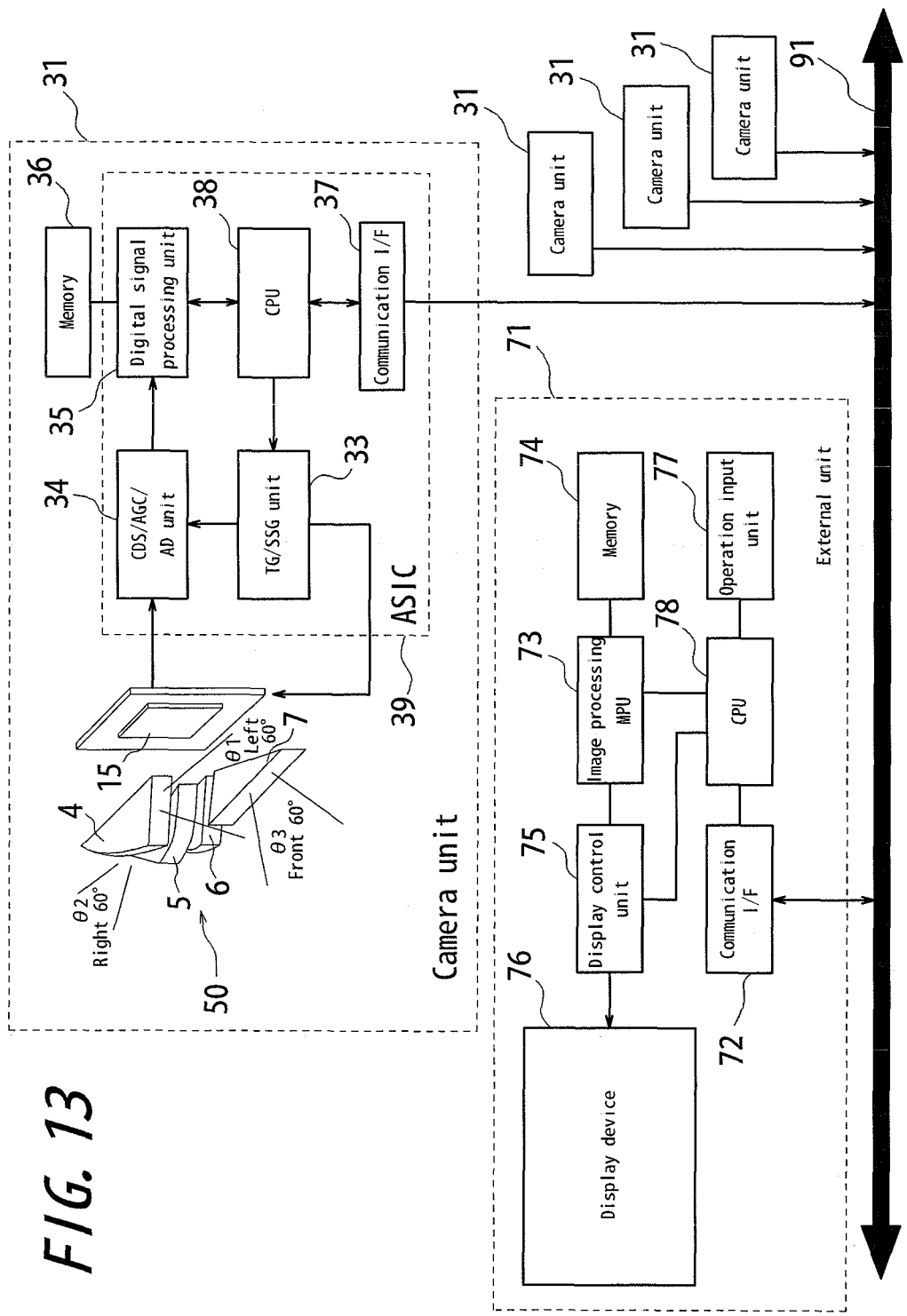
FIG. 13 is a block diagram illustrating the configuration of a camera system according to the second embodiment of the invention.

FIG. 13 is a block diagram illustrating the configuration of the camera system of the embodiment. In FIG. 13, the camera system has a plurality of camera units 31 and an external unit 71 controlling these camera units 31 to display an image. Each of camera units 31 and the external unit 71 are connected via a wireless or wired network 91 such as LAN (Local Area Network), IEEE1394 (Institute of Electrical and Electronic Engineers 1394) or the like, for example. In the camera system of the embodiment, four camera units 31 are connected to the external unit 71 via the network 91. The four camera units are disposed at front, rear, left and right door mirrors or the like of a vehicle when such units are provided in vehicles to support driving of the vehicle, and are disposed at other locations when they are directed at surveillance for crime-prevention and disaster-prevention.

The external unit 71 is provided with a communication I/F (the second communication unit) 72, an image processing MPU (image processing unit) 73, a memory 74, a display control unit 75, a display device 76, an operation input unit 77, and a CPU (the second control unit) 78 controlling the operation of each unit. Here, the display control unit 75 and the display device 76 constitute an image display unit. Moreover, the CPU 78 controls the operation of each camera unit 31 through the communication I/F 72.

In the external unit 71, depending on a display mode set at the operation input unit 77, the image processing MPU 73 performs image processing, using the memory 74, on image data input to the communication I/F 72 via the network 91 from each of camera units 31 under control of the CPU 78, and then the display control unit 75 displays the processed image data on the display device 76. It is noted that the display device 76 has a display size of WVGA (Wide Video Graphics Array) (800 pixels long.times.480 pixels wide), for example.

Here, when the number of pixels of the imaging device 15 is set to be 750 pixels×480 pixels, the number of pixels of partial images 51a to 51c covering each visual field, which has been divided into three and formed by the free-curved surface prisms 4, 5, 6, is 250 pixels wide and 480 pixels long, as shown in FIG. 12.

On the other hand, the three-divided partial images 51a to 51c are images covering a 180° field of view in total; a 60° field of view covering left side, a 60° field of view covering right side and a 60° field of view covering center. For this reason, in order to display an image on the display device 76 by combining three partial images, each of which has 250 pixels wide and 480 pixels long, as they are, 1440 pixels are required for the horizontal direction, and thus a panoramic image formed by combining three partial images cannot be displayed as it is on the display device 76 having a size of WVGA, although there is no problem with the vertical direction.

Then, the image processing MPU 73 performs, based on operation input to the operation input unit 77, processing such as image reduction, enlargement, cutout and the like in accordance with various display methods to be described later.

Next, the operation of the camera system according to the embodiment will be described.

Figure 14:
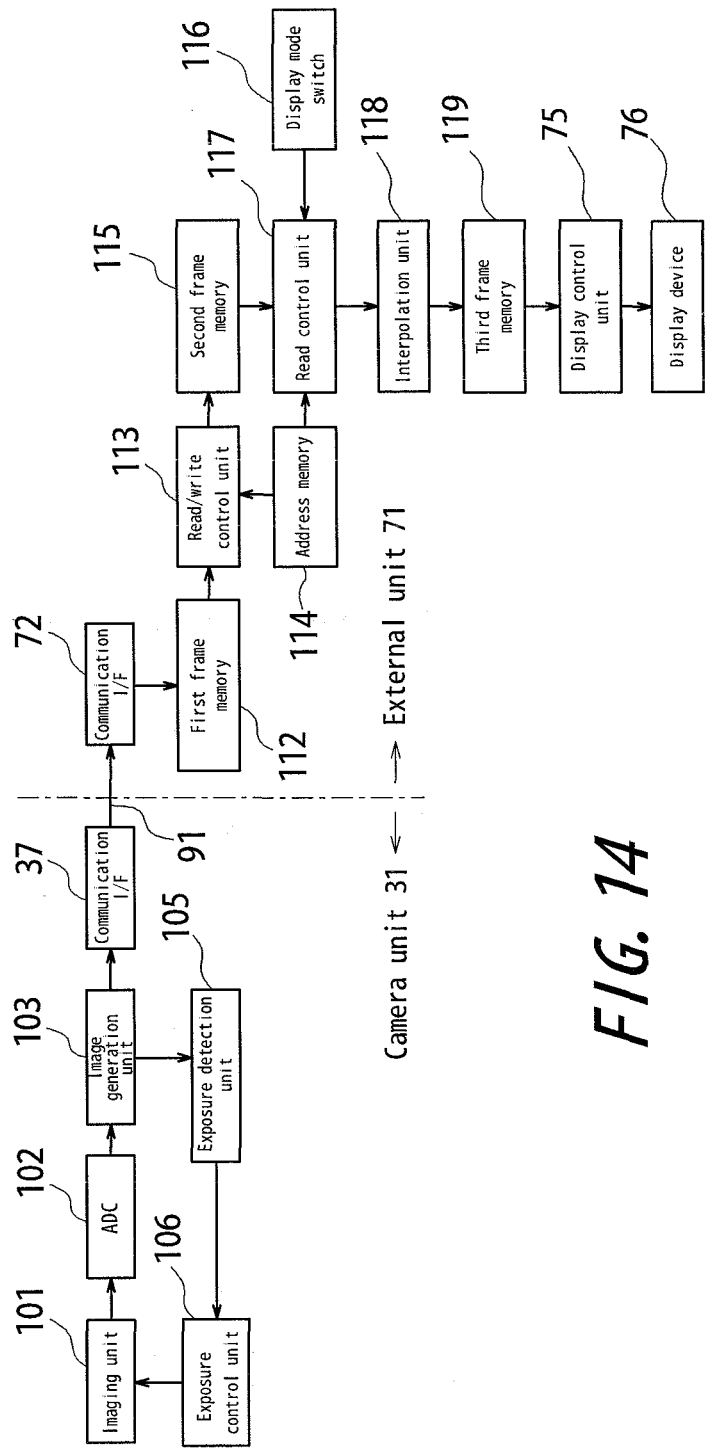
FIG. 14 is a functional block diagram for explaining the operation of the camera system shown in FIG. 13.
Figure 15:
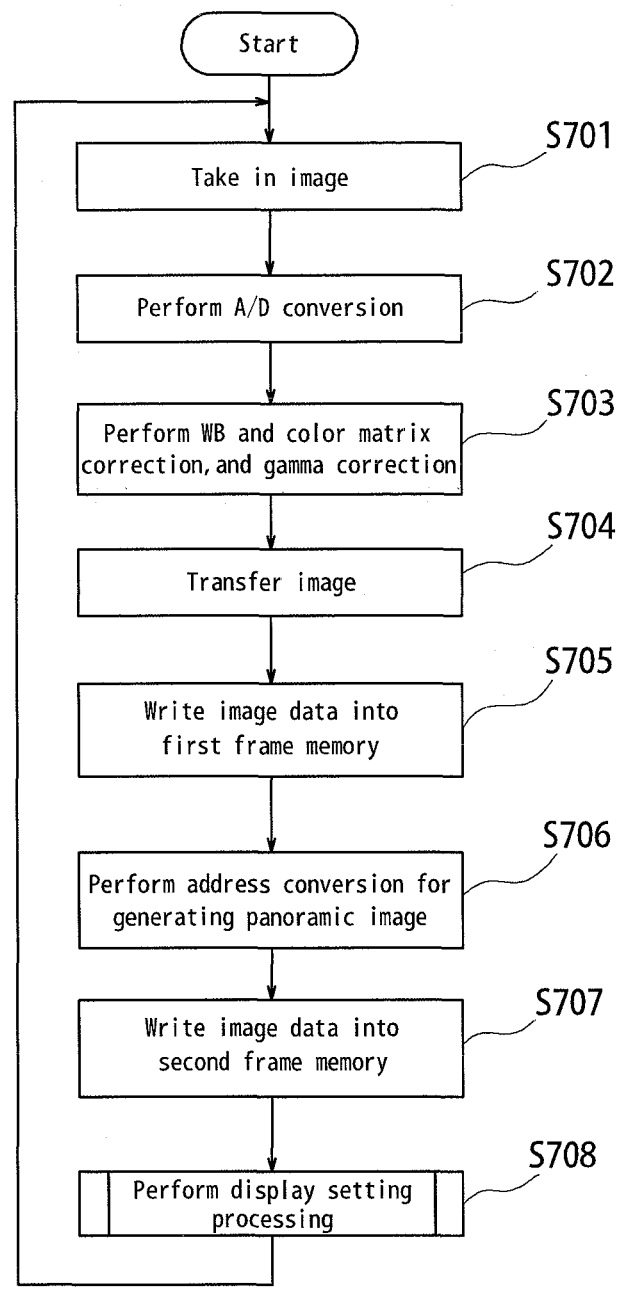
FIG. 15 is a flow chart for explaining the operation of the camera system shown in FIG. 13.
Figure 16:
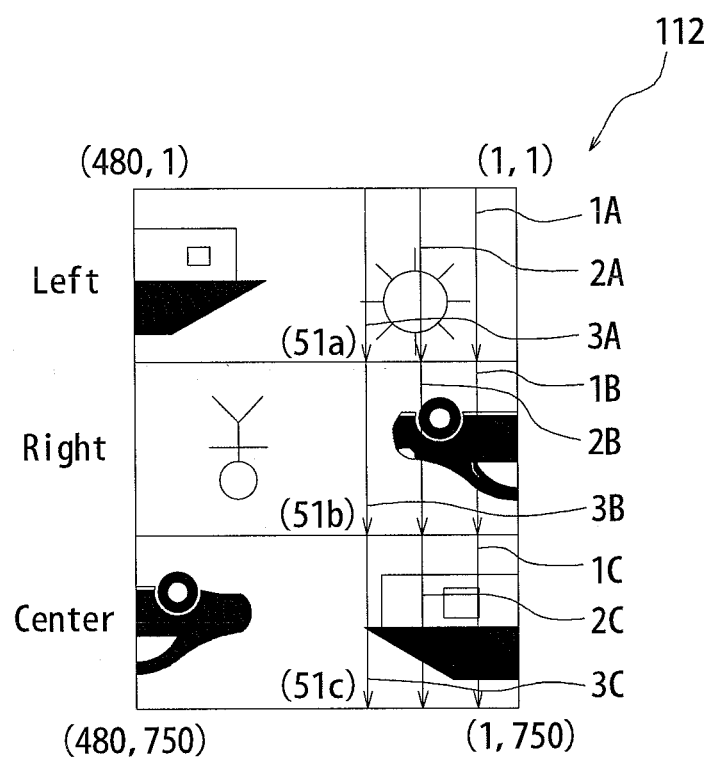
FIG. 16 is a diagram for explaining the reading of image data taken by the first camera unit, which is stored in the first frame memory shown in FIG. 14.
Figure 17:
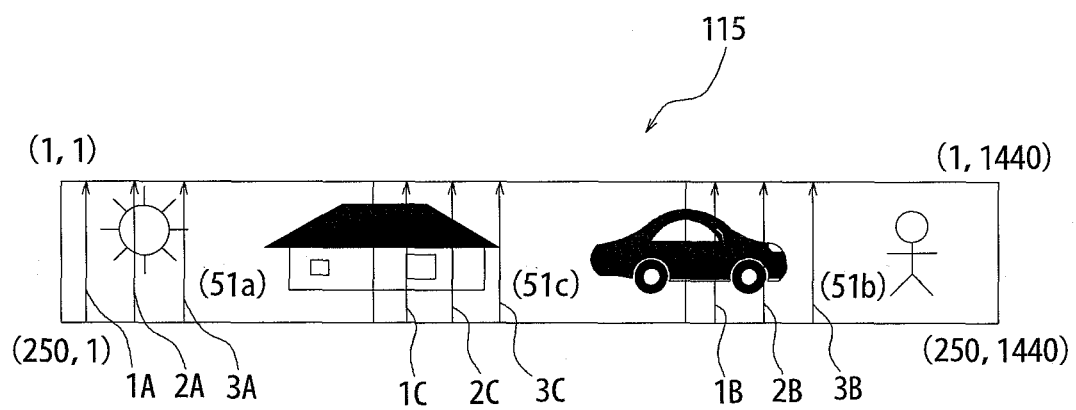
FIG. 17 is a diagram for explaining the writing of image data into the second frame memory shown in FIG. 14.
Figure 19:
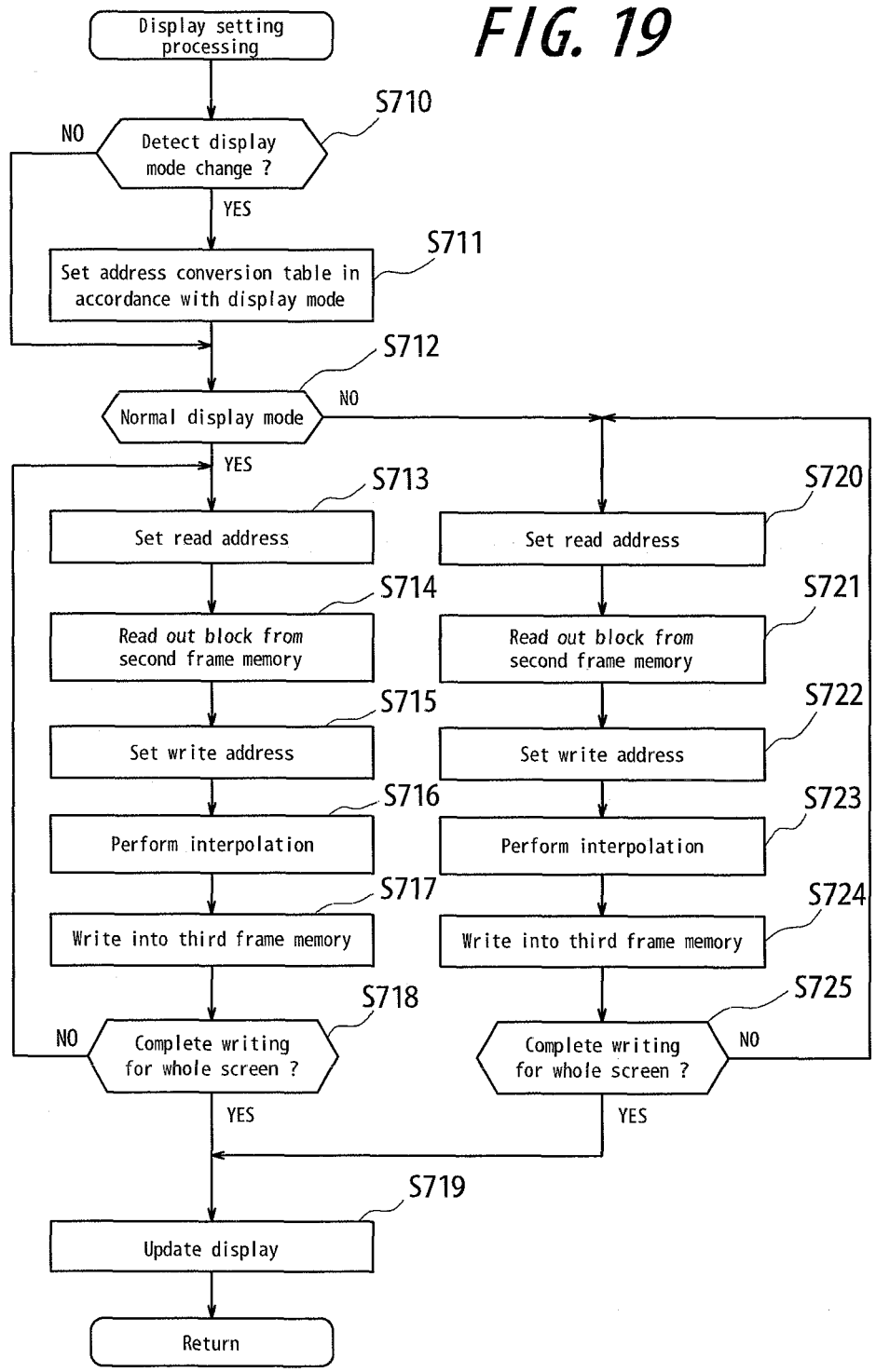
FIG. 19 is a flow chart illustrating display setting processing shown in FIG. 15.

FIG. 14 is a functional block diagram for explaining the operation of the camera system of the embodiment, and FIG. 15 is a flow chart for explaining the operation. FIG. 16 is a diagram for explaining the image data taken by the first camera unit, which is stored in the first frame memory shown in FIG. 14, and the reading thereof. FIG. 17 is a diagram for explaining the writing of the image data read out from the first frame memory shown in FIG. 14 into the second frame memory. FIG. 18 is a diagram exemplifying an address table for generating the panoramic images shown in FIG. 17. FIG. 19 is a flow chart illustrating display setting processing shown in FIG. 15.

As shown in FIGS. 14 and 15, in each of camera units 31, an imaging unit 101 takes in a subject image (Step S701) first and an ADC (A/D converter) 102 converts it to digital image signals (Step S702). Then, the digital image signals are subjected to processing such as color signal interpolation, color correction, white balance adjustment, gamma correction and the like by an image generation unit 103 (Step S703), and then color image data is generated. The image data thus generated is transferred to the external unit 71 through the communication I/F 37 and the network 91 (Step S704). The camera unit 31 is provided with an exposure detection unit 105 and an exposure control unit 106, in the same manner as general digital video cameras and the like, and the exposure control unit 106 controls the exposure of the imaging unit 101 automatically in accordance with an exposure value calculated by the exposure detection unit 105 based on luminance information from the imaging device 15.

Here, in the camera unit 31 of FIG. 14, the imaging unit 101 is constituted including the imaging device 15 and the imaging optical unit 50; the ADC 102 being constituted by the CDS/AGC/AD unit 34; the image generation unit 103 being constituted including the digital signal processing unit 35 and the memory 36; and the exposure detection unit 105 and the exposure control unit 106 being constituted including the TG/SSG unit 33.

In the external unit 71, the image data transferred from each of the camera units 31 is stored in a first frame memory 112 through the communication I/F 72 (Step S705). Here, the color image data, which is same as an image formed on the imaging device 15 in each of camera units 31, is stored in the first frame memory 112. Therefore, since the camera system of the embodiment has four camera units 31, four images, each of which is as shown in FIG. 16, are stored. For example, an image from the first camera unit 31 is stored in the addresses (1, 1) to (480, 750); an image from the second camera unit 31 being stored in the addresses (481, 1) to (960, 750); an image from the third camera unit 31 being stored in the addresses (961, 1) to (1440, 750); and an image from the fourth camera unit 31 being stored in the addresses (1441, 1) to (1920, 750).

The image data from each of camera units 31, which is stored in the first frame memory 112, is read out by a read/write control unit 113 with referring to an address conversion table for generating panoramic images, which is stored in an address memory 114 (Step S706), and is stored as a panoramic image in a second frame memory 115 (Step S707). Therefore, since the camera system of the embodiment has four camera units 31, four panoramic images, each of which is as shown in FIG. 17, are stored.

Here, FIGS. 16 and 17 illustrate a case in which image data from the first camera unit 31 is stored. That is, image data from the first camera unit 31 is stored in the addresses (1, 1) to (480, 750) of the first frame memory 112. In the embodiment, color pixel values indicated by RGB are stored in each address. Next, with referring to the address conversion table in FIG. 18 stored in the address memory 114, the image data stored in the first frame memory 112 is read out and then written into the second frame memory 115, thereby a panoramic image is stored in the second frame memory. The read/write control unit 113 reads out image data in the addresses (1, 1) to (1, 750) of the first frame memory 112, that is, the addresses (1, 1) to (1, 250) corresponding to 1A of FIG. 16, the addresses (1, 251) to (1, 500) corresponding to 1B thereof and the addresses (1, 501) to (1, 750) corresponding to 1C thereof in this order, with referring to the address conversion table in FIG. 18. Thereafter, the read/write control unit 113 writes the image data read out from 1A into the addresses (250, 1) to (1, 1) of the second frame memory 115, respectively, the image data read out from 1B into the addresses (250, 961) to (1, 960) thereof, respectively, and the image data read out from 1C into the addresses (250, 481) to (1, 481) thereof, respectively.

That is, the 1A line of FIG. 16 is written in the 1A of FIG. 17; the 1B line of FIG. 16 being written in the 1B line of FIG. 17; and the 1C line of FIG. 16 being written in the 1C line of FIG. 17. Such processing is performed with respect to the whole of captured image data stored in the first frame memory 112.

As shown in FIG. 17, such processing causes images stored in the first frame memory 112 to be reversed vertically and horizontally and arranged so that the images corresponding to a 60° field of view covering left side, a 60° field of view covering center and a 60° field of view covering right side compose one image corresponding to a 180° field of view, thus storing them as a panoramic image in the second frame memory 115.

Similarly, image data from the second to fourth camera units 31 is converted to panoramic images and stored in the second frame memory 115. In the second frame memory 115, therefore, a panoramic image by the first camera unit 31 is stored in the addresses (1, 1) to (250, 1440); a panoramic image by the second camera unit 31 being stored in the addresses (251, 1) to (500, 1440); a panoramic image by the third camera unit 31 being stored in the addresses (501, 1) to (750, 1440); and a panoramic image by the fourth camera unit 31 being stored in the addresses (751, 1) to (1000, 1440), for example.

Thereafter, a subroutine for display setting processing is performed (Step S708), and an image is displayed on the display device 76 according to a display mode by a display mode switch 116.

The camera system of the embodiment has, as the display mode, a normal display mode for displaying four panoramic images by four camera units 31, a combination display mode for enlarging, with reference to each of panoramic images in the normal display mode, one partial image selected respectively from panoramic images by selected two camera units 31 and reducing other partial images for display, and an enlarged display mode for enlarging one partial image selected respectively from panoramic images by four camera units 31 for display.

Figure 20:
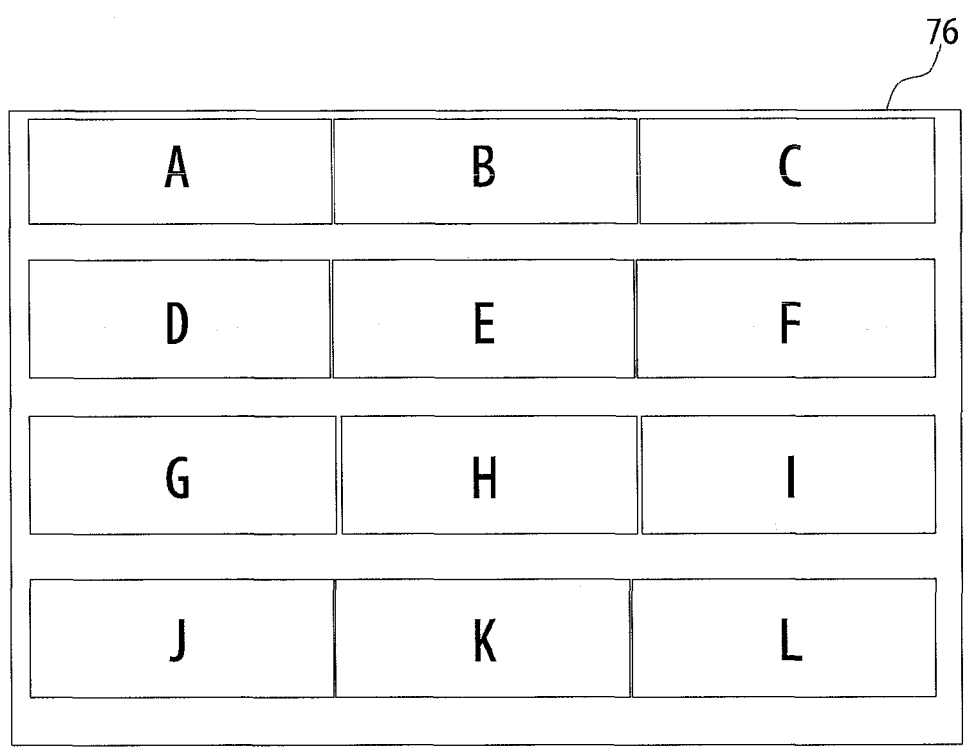
FIG. 20 is a diagram exemplifying a display in a normal display mode by the camera system shown in FIG. 13.
Figure 21:
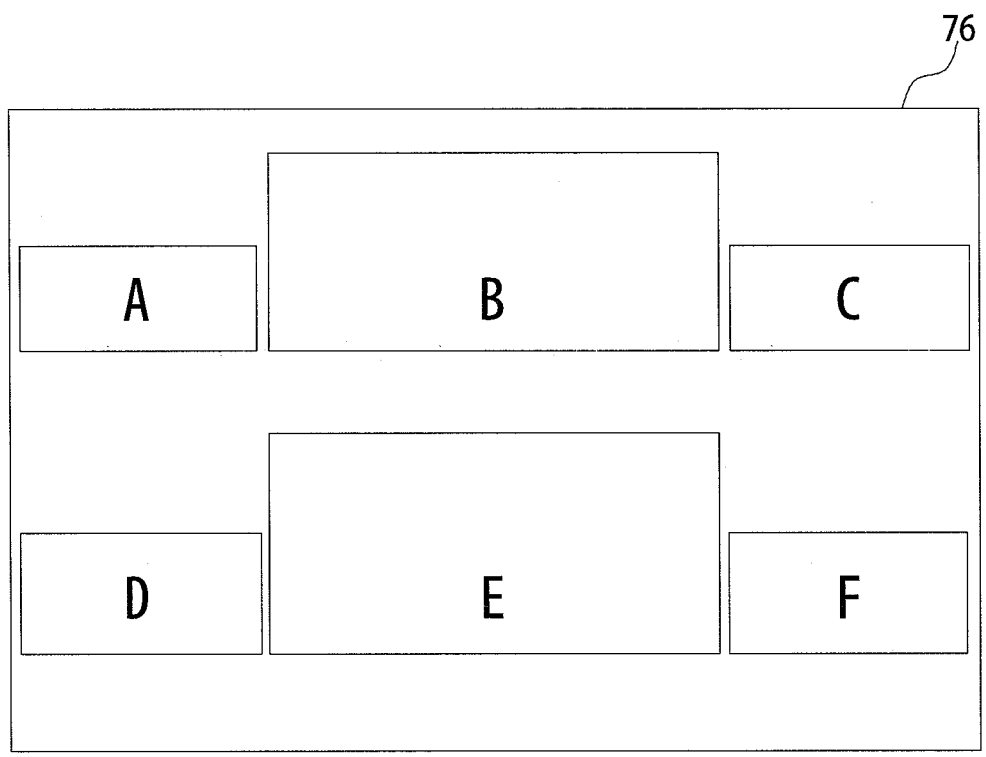
FIG. 21 is a diagram exemplifying a display in a combination display mode by the camera system shown in FIG. 13.
Figure 22:
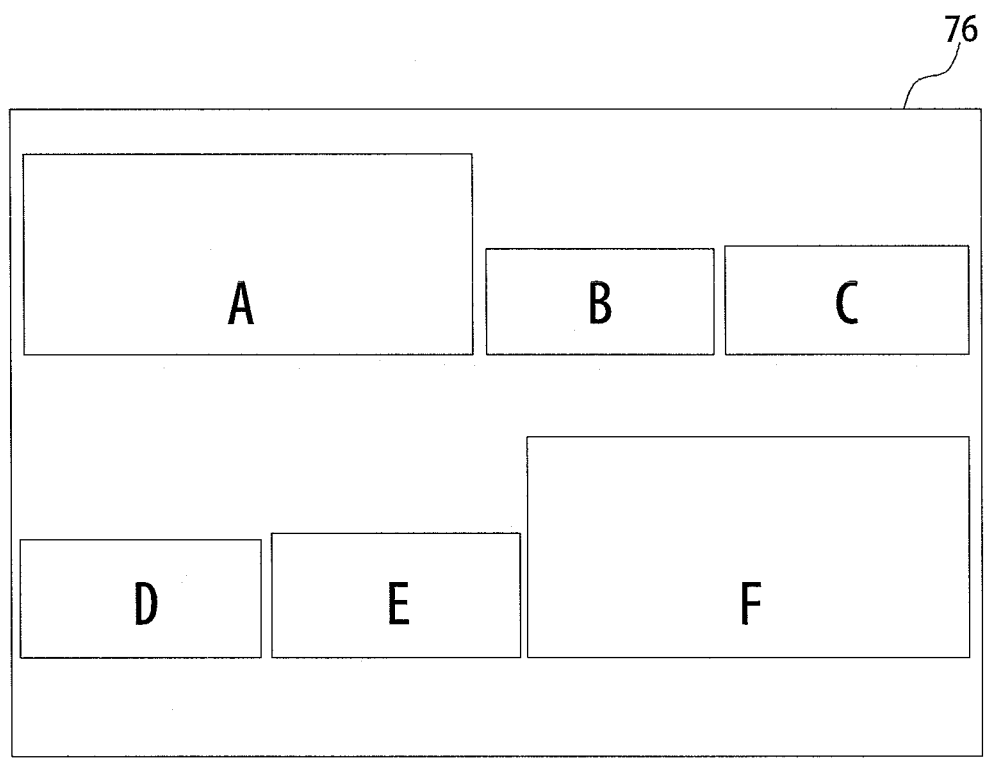
FIG. 22 is a diagram exemplifying another display in a combination display mode by the camera system shown in FIG. 13.

FIGS. 20 to 23 are diagrams exemplifying the image display on the display device 76 in accordance with a display mode set by the display mode switch 116 in display setting processing. FIG. 20 exemplifies the display in the normal display mode; FIGS. 21 and 22 exemplifying the display in the combination display mode; and FIG. 23 exemplifying the display in the enlarged display mode. It is noted that the same partial images are indicated with the same reference symbol in FIGS. 20 to 23.

As shown in FIG. 19, in display setting processing, a read control unit 117 detects setting change of the display mode first (Step S710). That is, the read control unit 117 detects whether or not the display mode switch has demanded the change of the display mode. When the display mode setting has been changed (Step S710: YES), the display setting processing proceeds to Step S711 to select an address conversion table corresponding to a display mode stored in the address memory 114. When the display mode setting has not been changed (Step S710: NO), on the other hand, the display setting processing proceeds to the following step S712 with the address conversion table which has been already selected.

At Step S712, it is judged whether or not the display mode is a normal display mode. When the mode is of normal display (Step S712: YES), as a result, each of panoramic images by four camera units 31 is displayed, as shown in FIG. 20. In this case, when the number of pixels of the imaging device 15 in each of camera units 31 is 750×480 pixels, a panoramic image covering a 180° field of view in total obtained by each of camera units 31 has 480×3=1440 pixels in a horizontal direction and 250 pixels in a vertical direction, as described above. For this reason, when a screen of the display device 76 has the number of pixels of WVGA, panoramic image data of four camera units 31, which is stored in the second frame memory 115, cannot be displayed all together as it is in size on the display device 76. In this case, therefore, it is necessary that each of panoramic images is reduced so that they can be displayed in a region of 800 pixels long×120 pixels wide on the display device 76.

At Step S713, therefore, the read control unit 117 selects an address conversion table corresponding to a current display mode written in the address memory 114, and calculates addresses of pixels (target pixels) to be read out from panoramic images by each of camera units 31, which are stored in the second frame memory 115.

Here, when the reduction ratio is not an integral number, most of target pixels are generally mapped on non-integral addresses through address conversion. It is noted that the term "non-integral address" indicates that the center of pixels to be mapped does not coincide with the center of pixels in which the pixels are to be mapped. In this case, a pixel value of an integral address in which a pixel is to be mapped is calculated based on a plurality of pixel values of pixels to be mapped. That is, surrounding pixels including the target pixel are read out as a block from the second frame memory 115 (Step S714), and addresses in which pixels are to be mapped are calculated based on the address and the reduction ratio of each of pixels in the read-out block to determine addresses into which pixels are written (Step S715).

Subsequently, an interpolation unit 118 calculates, through interpolation processing, a pixel value of the pixel to be positioned in an address of the display device 76 determined at Step S715 based on pixel values of the pixels which have been read out in block and non-integral addresses in which pixels are to be mapped (Step S716). The interpolation method in this case can be the known method such as bi-linear interpolation, bicubic interpolation or the like.

The pixel value calculated by interpolation processing at Step S716 is stored in a set address in a third frame memory 119 by a write control unit which is not shown (Step S717).

Thereafter, it is judged whether or not the writing of all pixels of the third frame memory 119 in accordance with a normal display mode has been completed, that is, whether or not the reduction processing on panoramic image data of four camera units 31 has been completed (Step S718). As a result, when the reduction processing has not been completed (Step S718: NO), the display setting processing proceeds to Step S713. When the reduction processing has been completed (Step S718: YES), the display control unit 75 transfers image data stored in the third frame memory 119 to the display device 76, and update processing is performed on the display image (Step S719). Thereby, the display device 76 displays a reduced panoramic image covering a 180° field of view by each of the camera units 31, as shown in FIG. 20.

Figure 23:
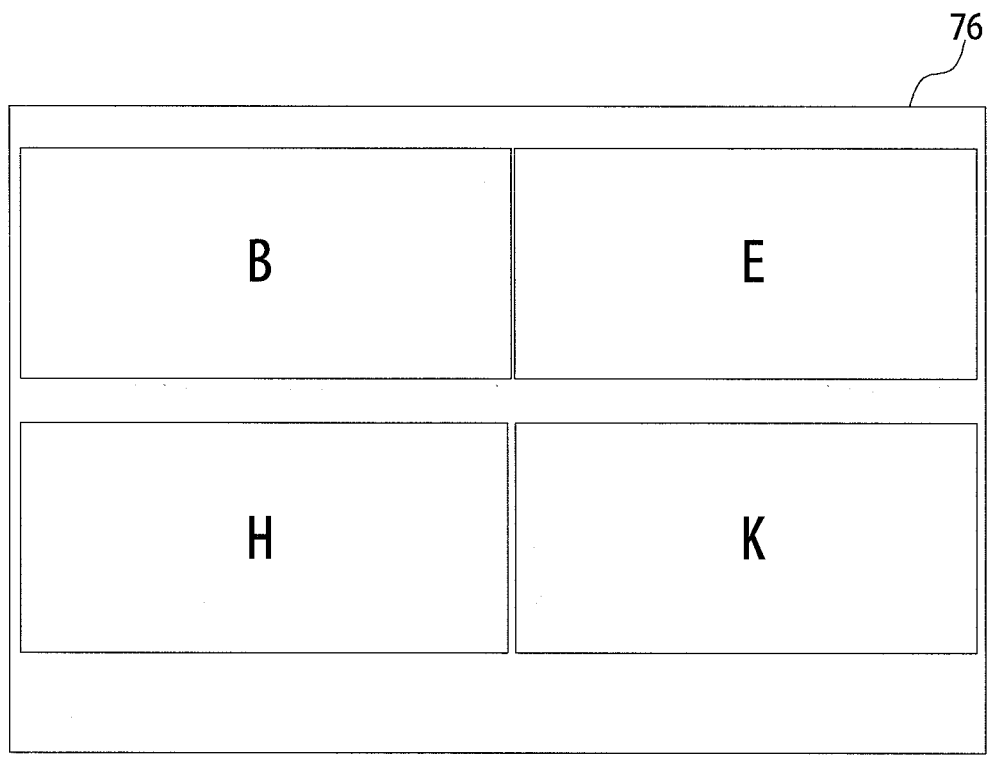
FIG. 23 is a diagram exemplifying a display in an enlarged display mode by the camera system shown in FIG. 13.

On the other hand, when the display mode is not of normal display at Step S712 (Step S712: NO), the processing depends on a display mode. In the combination display mode, each one of partial images selected respectively from panoramic images taken by selected two camera units 31 is enlarged and the other partial images are reduced for display, as shown in FIGS. 21 and 22. In the enlarged display mode, each one of partial images selected respectively from panoramic images taken by four camera units 31 is enlarged for display, as shown in FIG. 23.

FIG. 21 shows a case in which respective center partial image B, E of selected two camera units 31 are enlarged and the other partial images A, C, D, F are reduced for display. FIG. 22 shows a case in which a left-side partial image A is enlarged and the other partial images B, C are reduced for display with respect to one camera unit 31 of selected two camera units 31 and a right-side partial image F is enlarged and the other partial images D, E are reduced for display with respect to the other camera unit 31. Moreover, FIG. 23 shows a case in which respective center partial images B, E, H, K of four camera units 31 are selected and enlarged for display.

That is, when the mode is of combination display or of enlarged display, which include enlarged display of a partial image, the read control unit 117 selects an address conversion table corresponding to a current display mode written in the address memory 114 at Step S720, and calculates addresses of target pixels to be read out from partial images to be enlarged for display from panoramic images taken by each of camera units 31, which are stored in the second frame memory 115. When the mode is of combination display, which includes reduced display, addresses of target pixels read out from partial images to be reduced for display are also calculated.

Here, when the enlargement ratio is not an integral number, surrounding pixels including the target pixel are read out as a block from the second frame memory 115 (Step S721), and addresses in which pixels are mapped are calculated based on the address of each of pixels in the read-out block and the enlargement ratio to determine addresses into which pixels are to be written (Step S722). Subsequently, an interpolation unit 118 calculates, through the known interpolation processing such as bi-linear interpolation, bicubic interpolation or the like, a pixel value of the pixel to be positioned in an address of the display device 76 determined at Step S721 based on pixel values of the pixels which have been read out in block and non-integral addresses in which pixels are to be mapped (Step S723).

The pixel value calculated by interpolation processing at Step S723 is stored in a set address in the third frame memory 119 by a write control unit which is not shown (Step S724). Similarly, when the mode is of combination display including reduced display, the partial image to be reduced-displayed is reduced in the same manner as described for Steps S713 to S717, and stored in set addresses in the third frame memory 119.

Thereafter, it is judged whether or not the writing of all pixels of the third frame memory 119 in accordance with a display mode has been completed, that is, whether or not enlarged partial images, or enlarged partial images and reduced partial images are combined into the second moving image (Step S725). As a result, when the combination of the second moving image has not been completed (Step S725: NO), the display setting processing proceeds to Step S720. When the combination has been completed (Step S725: YES), the display control unit 75 transfers image data stored in the third frame memory 119 to the display device 76, and update processing is performed on the display images. Then, images in accordance with a display mode, such as shown in FIGS. 21 to 23, are displayed on the display device 76.

Here, when the mode is of combination display, a screen of the display device 76 is vertically divided into two, as shown in FIGS. 21 and 22. When a screen of the display device 76 has the number of pixels of WVGA, the screen is divided into two regions, each of which has 800 pixels long and 240 pixels wide. On each of divided regions, one of partial images which is selected from selected panoramic images, is enlarged and the other two partial images are reduced for display. Moreover, when the mode is of enlarged display, a screen of the display device 76 is divided into four, vertically and horizontally, as shown in FIG. 23. When a screen of the display device 76 has the number of pixels of WVGA, for example, the screen is divided into four regions, each of which has 400 pixels long and 240 pixels wide. On each of divided regions, one of partial images which is selected from each of panoramic images, is enlarged for display.

In the external unit 71 of FIG. 14, the first frame memory 112, the second frame memory 115, the third frame memory 119 and the address memory 114 are constituted by the memory 74 in FIG. 13, and the read/write control unit 113, the read control unit 117 and the interpolation unit 118 are constituted by the image processing MPU 73 and the CPU 78 in FIG. 13. The display mode switch 116 is constituted by the operation input unit 77 in FIG. 13.

As above, the camera system of the embodiment can display partial images having good visibility obtained from each of camera units 31 on the display device 76 in accordance with a display mode input from the operation input unit 77. Moreover, each of camera units 31 exerts function effects such as described in the first embodiment, which makes it possible to construct the whole system at low cost and to easily apply the system to various uses.

The invention is not limited to the above embodiments, and many variations and modifications can be implemented without departing from the scope of the invention. For example, the field of view covered by the camera unit 31 can be changed appropriately depending on the shape, the material and the combination of the free-curved surface prisms 4, 5, 6 used, and the field of view of each of the free-curved surface prisms 4, 5, 6 is not limited to a range of 60°.

Moreover, the imaging optical unit of the camera unit 31 can be constituted by a single free-curved surface prism forming a field of view in one direction (the combination of the front prism 7 and the free-curved surface prism 6 in the case of a field of view covering front), or by two free-curved surface prisms forming a field of views in any two directions. Moreover, the imaging optical unit can be arranged in ways that the field of view covering front is imaged by each of free-curved surface prisms via left and right front prisms to obtain stereo images having parallax, or that a free-curved surface prism forming an image of a field of view covering left and/or right is added to an optical system obtaining the stereo images.

In order to enable the imaging of a field of view covering 360°, it is possible to employ an arrangement in which a pair of camera units 31 having the above configuration are joined back-to-back and also an arrangement in which they are embedded vertically. Furthermore, when a plurality of free-curved surface prisms is used, free-curved surface prisms having a different enlargement ratio can be combined.

In addition, the camera system can be constituted by one camera unit 31 and the external unit 71, or by a plurality of camera units 31 other than four and one external unit 71. Moreover, the camera unit 31 and the external unit 71 are connected to each other not only through a network but also directly through a cable or radio. Furthermore, there can be used various display modes, such as for a display all together in which two partial images are enlarged and the other partial image is reduced in one panoramic image or a display in which only two partial images are enlarged for display.

Moreover, the camera system of the invention can be achieved by a system in which the external unit 71 is constituted by a CPU connected through bus, a memory of ROM or RAM, an input device, an output device, an external recording device, a medium drive device, a portable storage medium and a network connection device. That is, the camera system of the invention can be achieved in a way that the camera system is provided with a memory of ROM or RAM, an external recording device and a portable storage medium storing a program code of a software achieving the above function of the external unit 71, and then a computer of the camera system reads out and executes the program code.

In this case, a program code itself read out from a portable storage medium or the like achieves a new function of the external unit 71, and the portable storage medium or the like storing the program code constitutes the invention. Here, as the portable storage medium for supplying a program code can be used, for example, a flexible disk, a hard disk, an optical disc, a magnet-optical disk, a CD-ROM, a CD-R, a DVD-ROM, a DVD-RAM, a magnetic tape, a nonvolatile memory card, a ROM-card or various storage mediums storing through a network connecting device (that is, communication line) such as e-mail, online communications or the like.

Moreover, the configuration can be such that the above function of the external unit 71 is achieved in a way that a computer executes a program code read out on a memory or such that the above function of the external unit 71 is achieved through processing in which an OS or the like operating on a computer performs one part or the whole of actual processing based on the command of the program code.

Furthermore, a program code read out from a portable storage medium or a program (data) provided from a program (data) provider is written into a memory in a function enhancement board inserted in a computer or a function enhancement unit connected to a computer, and then a CPU or the like in the function enhancement board or the function enhancement unit performs one part of the whole of actual processing based on the command of the program code, thereby the above function of the external unit 71 can be achieved.

What is claimed is:

1. A camera unit comprising:
an imaging optical unit for forming images of a plurality of fields of view, the imaging optical unit having a plurality of free-curved surface prisms;
a single imaging device for photoelectrically-converting the images formed by the imaging optical unit;
a signal processing unit for processing the photoelectrically-converted signals from the imaging device and outputting image signals;
a communication unit for performing communication with an external unit; and
a control unit for controlling operation of the imaging device and the signal processing unit and transmitting the image signals output from the signal processing unit from the communication unit to the external unit, wherein
the plurality of free-curved surface prisms have the same shape, each has three optical surfaces of a first surface having a transmission function for light from the outside, a second surface having a light internal reflection function and a light transmission function and a third surface having a light reflection function, among which optical surfaces having at least a reflection function have a lens function as well,
where steps are provided on the both ends of the second surfaces of each of the free-curved surface prisms, and the imaging optical unit comprises
a frame for fixedly-holding the plurality of free-curved surface prisms in parallel with each other, the frame having seat portions which are positioned and shaded to receive and accommodate the steps of the plurality of free-curved surface prisms;
a holder for the frame itself being placed thereon, provided with a single imaging device for imaging light emitted from each of the free-curved surface prisms, as visual-field images, in parallel; and
a cover body having window holes open corresponding to the fields of view, for storing the frame and the free-curved surface prisms inside thereof with the cover body being fixed into the holder;
wherein the first surface of each of the free-curved surface prisms of the imaging optical unit has negative refractive power and the second surface and the third surface thereof have positive refractive power in the Y-Z plane;
wherein the imaging optical unit is provided with two free-curved surface prisms of a first free-curved surface prism or a second free-curved surface prism with its first surface facing toward a field of view covering either of right side or left side, and a third free-curved surface prism disposed in parallel with the first free-curved surface prism or the second free-curved surface prism; and
the third free-curved surface prism is provided with a front prism with its incidence surface facing toward a field of view covering front;
wherein an L-shaped fixed stop is disposed on an incidence surface of the front prism of the imaging optical unit and a tall elliptical fixed stop is disposed between the front prism and the third free-curved surface prism such that the L-shaped fixed stop and the tall elliptical fixed stop function to restrict incident light rays;
and the front prism is arranged at an upper position so that its incidence surface is at a higher position than the first surface of the third free-curved surface prism.

2. A camera unit comprising:
an imaging optical unit for forming images of a plurality of fields of view, the imaging optical unit having a plurality of free-curved surface prisms;
a single imaging device for photoelectrically-converting the images formed by the imaging optical unit;
a signal processing unit for processing the photoelectrically-converted signals from the imaging device and outputting image signals;
a communication unit for performing communication with an external unit; and
a control unit for controlling operation of the imaging device and the signal processing unit and transmitting the image signals output from the signal processing unit from the communication unit to the external unit, wherein
the plurality of free-curved surface prisms have the same shape, each has three optical surfaces of a first surface having a transmission function for light from the outside, a second surface having a light internal reflection function and a light transmission function and a third surface having a light reflection function, among which optical surfaces having at least a reflection function have a lens function as well, where steps are provided on the both ends of the second surfaces of each of the free-curved surface prisms, and the imaging optical unit comprises a frame for fixedly-holding the plurality of free-curved surface prisms in parallel with each other, the frame having seat portions which are positioned and shaded to receive and accommodate the steps of the plurality of free-curved surface prisms;

a holder for the frame itself being placed thereon, provided with a single imaging device for imaging light emitted from each of the free-curved surface prisms, as visual-field images, in parallel; and a cover body having window holes open corresponding to the fields of view, for storing the frame and the free-curved surface prisms inside thereof with the cover body being fixed into the holder;

wherein the first surface of each of the free-curved surface prisms of the imaging optical unit has negative refractive power and the second surface and the third surface thereof have positive refractive power in the Y-Z plane;

wherein the imaging optical unit comprises a first free-curved surface prism and a second free-curved surface prism disposed in parallel so that their first surfaces face toward a field of view covering right side and a field of view covering left side, respectively, with reference to a field of view covering front, and a third free-curved surface prism disposed in parallel so that its first surface faces toward the same direction as of the first surface of either of the first free-curved surface prism or the second free-curved surface prism;

and the third free-curved surface prism has a front prism with its incidence surface facing toward a field of view covering front;

wherein an L-shaped fixed stop is disposed on an incidence surface of the front prism of the imaging optical unit and a tall elliptical fixed stop is disposed between the front prism and the third free-curved surface prism such that the L-shaped fixed stop and the tall elliptical fixed stop function to restrict incident light rays;

and the front prism is arranged at an upper position so that its incidence surface is at a higher position than the first surface of the third free-curved surface prism.

3. A camera system comprising:

a camera unit; and an external unit, wherein the camera unit is provided with an imaging optical unit for forming subject images of a plurality of fields of view, the imaging optical unit having a plurality of free-curved surface prisms;

a single imaging device for photoelectrically-converting the subject images formed by the imaging optical unit;

a signal processing unit for processing the photoelectrically-converted signals from the imaging device and outputting image signals;

a first communication unit for performing communication with an external unit; and a first control unit for controlling operation of the imaging device and the signal processing unit and transmitting the image signals output from the signal processing unit from the first communication unit to the external unit; and the external unit is provided with a second communication unit for performing communication with the camera unit;

an image processing unit for processing image signals from the camera unit received by the second communication unit;

an image display unit for displaying an image based on the image signals image-processed by the image processing unit; and a second control unit for controlling operation of the camera unit through the second communication unit and operation of the image processing unit and the image display unit, wherein each of the plurality of free-curved surface prisms of the imaging optical unit has three optical surfaces of a first surface having a transmission function for light from the outside, a second surface having a light internal reflection function and a light transmission function and a third surface having a light reflection function, among which optical surfaces having at least a reflection function have a lens function as well, where steps are provided on the both ends of the second surface of each of the free-curved surface prisms, and the imaging optical unit comprises a frame for fixedly-holding the plurality of free-curved surface prisms in parallel with each other, the frame having seat portions which are positioned and shaped to receive and accommodate the steps of the plurality of free-curved surface prisms;

a holder for the frame itself being placed thereon, provided with a single imaging device for imaging light emitted from each of the free-curved surface prisms, as visual-field images, in parallel; and a cover body having window holes open corresponding to the fields of view, for storing the frame and the free-curved surface prisms inside thereof with the cover body being fixed into the holder;

wherein the first surface of the free-curved surface prism of the imaging optical unit has negative refractive power and the second surface and the third surface thereof have positive refractive power in an Y-Z plane;

wherein the imaging optical unit is provided with two free-curved surface prisms of a first free-curved surface prism or a second free-curved surface prism with its first surface facing toward a field of view covering either of right side or left side, with reference to a field of view covering front, and a third free-curved surface prism disposed in parallel with the first free-curved surface prism or the second free-curved surface prism; and the third free-curved surface prism is provided with a front prism with its incidence surface facing toward a field of view covering front;

wherein an L-shaped fixed stop is disposed on an incidence surface of the front prism of the imaging optical unit and a tall elliptical fixed stop is disposed between the front prism and the third free-curved surface prism such that the L-shaped fixed stop and the tall elliptical fixed stop function to restrict incident light rays; and the front prism is arranged at an upper position so that its incidence surface is at a higher position than the first surface of the third free-curved surface prism.

4. The camera system according to claim 3, wherein the image processing unit generates one panoramic image from subject images formed on a plurality of regions of the imaging device, received by the second communication unit.

5. The camera system according to claim 3, wherein a plurality of the camera units is connected to the external unit;

the external unit further has an operation input unit for inputting a display mode of images into the image display unit; and the second control unit image-processes image signals from the plurality of camera units at the image processing unit in accordance with a display mode input from the operation input unit and displays them on the image display unit.

6. A camera system comprising:

a camera unit; and an external unit, wherein the camera unit is provided with an imaging optical unit for forming subject images of a plurality of fields of view, the imaging optical unit having a plurality of free-curved surface prisms;

a single imaging device for photoelectrically-converting the subject images formed by the imaging optical unit;

a signal processing unit for processing the photoelectrically-converted signals from the imaging device and outputting image signals;

a first communication unit for performing communication with an external unit; and a first control unit for controlling operation of the imaging device and the signal processing unit and transmitting the image signals output from the signal processing unit from the first communication unit to the external unit; and the external unit is provided with a second communication unit for performing communication with the camera unit;

an image processing unit for processing image signals from the camera unit received by the second communication unit;

an image display unit for displaying an image based on the image signals image-processed by the image processing unit; and a second control unit for controlling operation of the camera unit through the second communication unit and operation of the image processing unit and the image display unit, wherein each of the plurality of free-curved surface prisms of the imaging optical unit has three optical surfaces of a first surface having a transmission function for light from the outside, a second surface having a light internal reflection function and a light transmission function and a third surface having a light reflection function, among which optical surfaces having at least a reflection function have a lens function as well, where steps are provided on the both ends of the second surface of each of the free-curved surface prisms, and the imaging optical unit comprises a frame for fixedly-holding the plurality of free-curved surface prisms in parallel with each other, the frame having seat portions which are positioned and shaped to receive and accommodate the steps of the plurality of free-curved surface prisms;

a holder for the frame itself being placed thereon, provided with a single imaging device for imaging light emitted from each of the free-curved surface prisms, as visual-field images, in parallel; and a cover body having window holes open corresponding to the fields of view, for storing the frame and the free-curved surface prisms inside thereof with the cover body being fixed into the holder;

wherein the first surface of the free-curved surface prism of the imaging optical unit has negative refractive power and the second surface and the third surface thereof have positive refractive power in an Y-Z plane;

wherein the imaging optical unit comprises a first free-curved surface prism and a second free-curved surface prism disposed in parallel so that their first surfaces face toward a field of view covering right side and a field of view covering left side, respectively, with reference to a field of view covering front, and a third free-curved surface prism disposed in parallel so that its first surface faces toward the same direction as of the first surface of either of the first free-curved surface prism and the second free-curved surface prism;

and the third free-curved surface prism has a front prism with its incidence surface facing toward a field of view covering front;

wherein an L-shaped fixed stop is disposed on an incidence surface of the front prism of the imaging optical unit and a tall elliptical fixed stop is disposed between the front prism and the third free-curved surface prism such that the L-shaped fixed stop and the tall elliptical fixed stop function to restrict incident light rays; and the front prism is arranged at an upper position so that its incidence surface is at a higher position than the first surface of the third free-curved surface prism.

7. The camera system according to claim 6, wherein the image processing unit generates one panoramic image from subject images formed on a plurality of regions of the imaging device, received by the second communication unit.

8. The camera system according to claim 6, wherein a plurality of the camera units is connected to the external unit;

the external unit further has an operation input unit for inputting a display mode of images into the image display unit; and the second control unit image-processes image signals from the plurality of camera units at the image processing unit in accordance with a display mode input from the operation input unit and displays them on the image display unit.

* * * * *